(12) United States Patent
McGuigan et al.

(10) Patent No.: US 12,472,509 B2
(45) Date of Patent: Nov. 18, 2025

(54) MAGNETIC ASSEMBLY FOR USE IN A DEVICE FOR CONDUCTING ASSAYS

(71) Applicant: LumiraDx UK Ltd., London (GB)

(72) Inventors: Brian McGuigan, London (GB); Aman Khan, London (GB)

(73) Assignee: LumiraDx UK Ltd., London (GB)

( * ) Notice: Subject to any disclaimer, the term of this patent is extended or adjusted under 35 U.S.C. 154(b) by 1226 days.

(21) Appl. No.: 17/291,233

(22) PCT Filed: Nov. 12, 2019

(86) PCT No.: PCT/GB2019/053207
§ 371 (c)(1),
(2) Date: May 4, 2021

(87) PCT Pub. No.: WO2020/099861
PCT Pub. Date: May 22, 2020

(65) Prior Publication Data
US 2021/0370313 A1   Dec. 2, 2021

(30) Foreign Application Priority Data

Nov. 12, 2018 (GB) .................................. 1818412

(51) Int. Cl.
*B03C 1/033* (2006.01)
*B03C 1/28* (2006.01)
*G01N 33/543* (2006.01)

(52) U.S. Cl.
CPC ............ *B03C 1/0332* (2013.01); *B03C 1/288* (2013.01); *G01N 33/54326* (2013.01); *B03C 2201/18* (2013.01); *B03C 2201/26* (2013.01)

(58) Field of Classification Search
CPC ... B03C 1/0332; B03C 1/288; B03C 2201/18; B03C 2201/26; G01N 33/54326
See application file for complete search history.

(56) References Cited

U.S. PATENT DOCUMENTS 6,558,541 B1   5/2003   Morrison
6,623,983 B1   9/2003   Terstappen et al.
(Continued)

FOREIGN PATENT DOCUMENTS

CA   2900370 A1   10/2015
EP   2488871 A1   8/2012
(Continued)

OTHER PUBLICATIONS

International Search Report and Written Opinion for PCT/GB2019/053207 dated Apr. 1, 2020.

*Primary Examiner* — Jill A Warden
*Assistant Examiner* — Michael Stanley Gzybowski
(74) *Attorney, Agent, or Firm* — Goodwin Procter LLP

(57) ABSTRACT

A magnetic assembly for use in a device for conducting assays is disclosed. The magnetic assembly comprises a pole piece having a longitudinal shaft interposed between at least two magnetic elements, each of the at least two magnetic elements having a north magnetic pole and a south magnetic pole; the at least two magnetic elements being orientated such that each north magnetic pole or each south magnetic pole is aligned inwardly towards the shaft; and wherein the pole piece comprises a cap at one end of the shaft which extends at least partially over a lateral surface of each of the at least two magnetic elements. Also disclosed is a device for conducting assays and a method of operating the device.

18 Claims, 15 Drawing Sheets

(56) References Cited

U.S. PATENT DOCUMENTS

| | | | |
|---|---|---|---|
| 9,636,689 B2 | 5/2017 | Smith et al. | |
| 2002/0149453 A1* | 10/2002 | Snitchler | H01F 41/061 |
| | | | 335/182 |
| 2004/0004523 A1* | 1/2004 | Humphries | B03C 1/0332 |
| | | | 335/296 |
| 2010/0060893 A1 | 3/2010 | Norton et al. | |
| 2017/0080420 A1 | 3/2017 | Lowe et al. | |
| 2019/0366338 A1 | 12/2019 | Yantz et al. | |

FOREIGN PATENT DOCUMENTS

| | | |
|---|---|---|
| FR | 1227281 A | 8/1960 |
| GB | 1028862 A | 5/1966 |
| JP | 2009154149 A | 7/2009 |
| JP | 2015163038 A | 9/2015 |
| SU | 817866 | 3/1981 |
| WO | WO2010/036808 A1 | 4/2010 |
| WO | WO-2016077364 A2 | 5/2016 |
| WO | WO2018/002668 A1 | 1/2018 |

\* cited by examiner (a)

(b)

MAGNETIC ASSEMBLY FOR USE IN A DEVICE FOR CONDUCTING ASSAYS

RELATED APPLICATIONS

This application is a § 371 National Stage Application of PCT/GB2019/053207, filed Nov. 12, 2019, which claims priority to and the benefit of United Kingdom Patent Application No. 1818412.7, filed Nov. 12, 2018, the entire disclosure of each of which is incorporated herein by reference for all purposes.

FIELD OF THE INVENTION

The present invention relates to a magnetic assembly, suitable for use in, for example, a medical device for conducting assays. The invention also relates to an apparatus for manoeuvring the magnetic assembly into and out of an operating location, a device incorporating the same and a method of operating the device.

BACKGROUND

An assay is an analytical procedure for testing a sample to assess the presence, amount or functional activity of a specific entity, referred to as an analyte. Assays are commonly used in medical, pharmaceutical, environmental and biological applications.

Assay analysis often requires the use of highly specialised equipment by technically skilled operatives. Such equipment is also typically large and complex and, as a result, assay analysis is normally only available at large scale laboratories. Due to the nature of such equipment and staff, the availability to have assays conducted can be severely limited. Consequently, samples requiring assay analysis may be required to be sent to a remote laboratory for testing, which can incur significant time and financial costs.

In medical applications, this can be of particular importance as a sample taken from a patient will need to be sent to the laboratory for analysis, and this can delay diagnosis and/or treatment for the patient, which can potentially have severe consequences.

While this is necessary and unavoidable for certain situations, for example highly complicated tests, for more simple and routine tests Point-of-care testing (POCT) offers a faster and more efficient alternative.

POCT provides a means of performing an assay using a device that is located at the time and place of patient care, for example, in a home or local medical centre. This allows test results to be obtained rapidly without requiring the patient or sample to be transported for further testing; thus providing time and financial savings, and permitting faster and more efficient diagnosis and treatment for the patient. The use of POCT is limited and is currently only suitable for certain types of tests. Within medical applications, POCT is typically used for testing of liquid samples such as blood, urine or saliva and common examples include pregnancy tests and blood glucose tests.

A sample may be introduced on a test strip, which may be encased in plastic in the form of a cassette, for enhanced durability and to protect the sample contained inside. Alternatively, the test strip may be in the form of a glass slide or paper strip. The test strip may include multiple capillary channels, and when the liquid sample is introduced to the test strip, the liquid is able to flow along the capillary channels to various test regions via capillary action or forced movement. The multiplicity of capillary channels permits independent measurements to be performed simultaneously. The test strip may include multiple zones within each capillary channel to allow different compounds to be introduced to the sample at different times as the fluid travels along the capillary channels. A test machine then performs high sensitivity analysis on the test strip, or alternatively, the test strip may be configured to have an intrinsic indicator, such as a screen, or colour changing region to alert the user or patient to the presence, or lack thereof, of the analyte in question.

There are a number of ways in which the test strips can be configured. A common configuration, referred to as a "sandwich assay", involves capture particles, and detection particles present in the test strip. The capture particles are arranged to locate the analyte in question; and the detection particles provide a visual indicator, such as fluorescence. The capture particles and detection particles have antibodies or other binding agents (e.g. peptides, antibody fragments, nucleic acids, polymers, molecules, chemicals etc.) physically or chemically attached to the capture or detection particle, which specifically bind to the analyte to facilitate the sandwich assay. The detection antibody may also be bound to, for example, a single molecule e.g. a fluorophore. The capture antibody is attached to a magnetic particle with sufficient paramagnetic material content to be attracted and retained by an applied magnetic field. The capture and detection antibodies form the sandwich assay whilst the particles or molecules attached facilitate magnetic field capture or fluorescent detection, respectively. Thus, when the sample is introduced to the test strip, if the analyte is present, the capture antibodies bind with the analyte to locate it in a magnetic field and the detection antibodies also bind with the analyte to produce a visual indication, which can be directly read by the user, or analysed using suitable measurement techniques, such as spectrophotometry. Sandwich assays are commonly used due to their short analysis times and low cost. Additional assay configurations could include enzymatic based assays whereby the detectable analyte interacts with the detection particles such that a change in signal, for example fluorescence intensity can be detected.

Thus, it is common for a test strip to comprise magnetic beads as capture particles to attach to the analyte via a capture antibody, such that a magnetic field can be applied to the sample, attracting the magnetic beads towards the bed of the test strip, pinning the analyte and associated detection particles in the process. This then allows the test strip to be washed, flushed, or evacuated to remove any unbound sample and other particles to increase the sensitivity of the assay, and thus improve the accuracy of the result. In such cases, typically, either high-power Neodymium (typical grades of which being N42 to N55) permanent magnets, or large coil wound electro-magnets are used to generate the magnetic field. However, each of these solutions faces a number of limitations.

Permanent neodymium magnets exhibit very high field strength, typically in the region of up to 600 mT to 700 mT (milli Teslas) measured at a surface of one pole of the magnet. While this provides strong pulling forces for attracting and restraining the magnetic beads in the test strip during evacuation of the sample, there can be limitations associated with the homogeneity of the field strength as a result of change in gradient and associated force vectors across the surface of interest of the magnet, causing variations and discrepancies between different regions of the test strip.

In regions of lower magnetic field strength, this can result in magnetic beads not adhering to the test strip bed accurately, such that some of the analyte may be displaced during the evacuation of the sample, thus affecting the accuracy of the final measurement. In the case where a single magnet is used, limitations associated with the quality of material and production process can lead to a localised area of low field strength resulting in a non-uniform formation or spread of the paramagnetic particles.

Further issues exist with the homogeneity of the magnetic field strength when multiple magnets are used as part of a magnetic assembly. Discrepancies and discontinuities in the grain size and structure of the magnets can cause their respective field strengths to differ, creating further inhomogeneity.

Moreover, with the very strong magnetic force of neodymium magnets, there is a risk that the magnetic force may interfere with the reaction kinetics of the analyte interaction with the capture and detection particles provided in a reagent. Consequently, in order to ensure a complete reaction occurs, it is important that the magnet is located away from the test strip when the reaction takes place, but be positioned close to the sample for the evacuation of the test strip.

This can be achieved by manoeuvring the magnet into and out of an operating position. However, the magnet must be moved precisely so that the magnetic beads are aligned correctly. Any slight inaccuracies in the positioning of the magnet, may introduce inaccuracies in the retention of the analyte and detection particles.

The manner in which the magnet is manoeuvred is also critical. If the magnet is moved into position in a horizontal plane, there is a risk that as the magnet moves towards the sample, the attractive force acting on the magnetic beads may displace the beads before the magnet reaches the correct location, potentially resulting in inaccurate or erroneous results. Alternatively, the magnet can be moved into position vertically, however, due to the high strength of the magnet, the magnet must be moved by a significant distance such that the effect of the magnet on the test strip is reduced to a negligible amount when not in use. This poses practical issues in relation to the size and shape of the diagnostic apparatus.

In addition at relatively low field strengths, for example, in the region of 5 mT to 10 mT as measured at the location of the test strip, the presence of a magnetic field may be too weak to accumulate or displace the paramagnetic particles, however may be strong enough to retard the free movement of the paramagnetic particles, which can reduce the efficiency of the binding phase of the assay process.

The above problem may be mitigated through the use of shielding which protects the sample from the magnetic field during an interaction stage when the sample is mixed with the reagent, but which can be removed to expose the sample to the magnetic field when required. However, the magnetic forces between the magnet and the shield must also be considered. When positioned close to the magnet, the shield will be attracted to the magnet and the force required to move the magnet away from the shield (or vice versa) can become significant. Thus, potentially a large, high powered motor may be required; adding expense and physical size to the apparatus.

Such a physically large apparatus can pose logistical issues for use of the device and render it impractical for point of care testing.

Electromagnets have the distinct advantage that the magnetic force can be switched off when not in use, meaning that the magnet does not need to be moved away from the sample to avoid interference during an initial reaction or incubation period. Due to the ability to vary the strength of electromagnets, it is also relatively simple to tailor the magnets to ensure consistent field strength between multiple magnets and to avoid discrepancies. It is further possible to obtain a relatively homogeneous magnetic field across the sample area. However, electromagnets suffer from reduced efficiency and are only capable of generating relatively low field strengths when compared to permanent magnets, typically in the region of 250 mT, even at large electrical power input. The large electrical power input required generates significant heat, which requires subsequent management and dissipation, further increasing power consumption. With the lower field strength, the poles of the electromagnet must be positioned very close to, or even come into contact with, the sample in order to provide the highest possible field strength. This means that any heat management devices such as radiators and heat sinks must accommodate the required proximity of the electromagnets to the sample. Furthermore, due to size restrictions, it is potentially impossible to incorporate a heat sink close to a tip of the electromagnets, where the temperature control is most critical. This therefore limits the power at which the electromagnets can be operated.

However, the biggest disadvantage of both neodymium permanent magnets and electromagnets is the localised nature of the magnetic field at the magnetic poles. This may result in a narrow band (i.e. line) of high magnetic field strength which runs along the length of the magnet and to which the magnetic beads are attracted. In some cases, a circular electromagnet (e.g. a coil wrapped around a cylindrical pole) is employed and this produces a narrow circular field, which is also localised as a point source of high magnetic field strength. Consequently, the size of the area that can be analysed at one time is limited, and so the sample must be moved during the capture phase in order to scan and analyse all regions of the sample. However, moving the sample relative to the magnet can impose displacement forces on the magnetic beads, increasing the difficulty of restraining them against the test strip bed. Furthermore, due to the bipolar nature of the field lines, the magnetic field in an interrogation zone may become banded, effectively generating two distinct lines of high magnetic field strength. This can cause further problems in analysing the sample and quantifying the obtained results.

It is an object of the present invention to obviate and/or mitigate the limitations and/or disadvantages associated with the prior art and/or with conventional permanent magnets and electromagnets for use in a device for conducting assays by presenting a new magnetic assembly.

SUMMARY OF THE INVENTION

According to a first aspect of the present invention there is provided a magnetic assembly for use in a device for conducting assays, the magnetic assembly comprising a pole piece having a longitudinal shaft interposed between at least two magnetic elements, each of the at least two magnetic elements having a north magnetic pole and a south magnetic pole; the at least two magnetic elements being orientated such that each north magnetic pole or each south magnetic is aligned inwardly towards the shaft; and wherein the pole piece comprises a cap at one end of the shaft which extends at least partially over a lateral surface of each of the at least two magnetic elements.

Thus, embodiments of the first aspect of the invention provide a magnetic assembly having a pole piece configured to preferentially direct a magnetic field through the cap, which is in turn arranged to reduce magnetic flux density at a pole of the magnetic assembly, effectively spreading high magnetic field strength over an extended area in the region of the cap. As will be explained in more detail below, such an arrangement can be advantageously used in a device for conducting assays because the area of high magnetic field strength created by the cap can be used to pin down individual magnetic particles across an entire interrogation zone for subsequent detection and quantification. This is unlike the prior art described above whereby, at best, the magnetic particles in the interrogation zone are drawn into a line of high magnetic field strength such that only a bulk measurement can be made.

The cap may comprise a convexly curved surface to create a dome or arcuate surface. The cap may be integral with the shaft. The main functions of the cap are to preferentially direct the magnetic field upwards (like in a partial Halbach arrangement) and to control a return path of the magnetic field by providing a controlled magnetic pathway.

The pole piece may have an end opposite the cap which is flush with an adjacent face of one or more of the at least two magnetic elements.

The pole piece may have an end opposite the cap which is offset from an adjacent face of one or more of the at least two magnetic elements. In some embodiments, the shaft may be shorter than one or more of the magnetic elements. This may help to direct more of the magnetic field strength through the cap.

At least one metal plate may be disposed on a side of one or more of the at least two magnetic elements, wherein the side faces outwardly of the pole piece. The metal plates may be employed as an aid to constrain the return path of the magnetic field from the pole piece to the corresponding opposite pole faces of the magnetic elements. The metal plates may be located on a top or side surface of each magnet, where a gap between the pole piece and each metal plate is sufficient to ensure no loss in field strength at a desired location. The metal plates may be the same height/length or less than the height/length of the shaft. Alternatively, the metal plates could be attached to a pole face of each magnetic element. In this case the metal plates could be attached to an opposite pole to that associated with (and adjacent to) the pole piece shaft. In this case, it could be beneficial to cut the length of the metal plates to ensure that the magnetic circuit is biased to an end of the magnetic assembly associated with an area of interest on a test strip (i.e. the interrogation zone). The metal plates may run a full length of the magnetic assembly (in a direction spanning the test strip channels). In some embodiments, there may be benefit of cutting the length of the metal plates in a dimension normal to the test strip face, in the case where the metal plates are attached to the free pole face of each of the two magnetic elements. The metal plates may be made of ferromagnetic material as opposed to being magnetic themselves. In general, the metal plates may be required to be large enough to bias and constrain the magnetic field from an unfocussed path it would otherwise take. The metal plates may be required to not be too large or too close to the shaft so as to interfere with the field shaping and concentration associated with the pole piece. In some embodiments, two metal plates are arranged symmetrically to ensure an even spread of magnetic particles over the interrogation zone within the test strip, with a centre of the magnetic assembly being central to a test channel.

The at least two magnetic elements may have a magnetic field strength sufficient for causing an attractive force between each of the at least two magnetic elements and the pole piece to be greater than a repellent force between the at least two magnetic elements, such that the magnetic assembly is held together by magnetic forces.

The at least two magnetic elements may be formed of a material having a grain size of less than 3 micrometres, or less than 2 micrometres, or less than 1 micrometre, or less than 0.5 micrometres.

A variation in alignment of the north magnetic poles or south magnetic poles of the at least two magnetic elements may be less than 5 degrees, or less than 2 degrees, or less than 1 degree, or less than 0.5 degrees.

The pole piece and/or the at least two magnetic elements may comprise one or more of: ferrite, iron, cobalt, magnetite, neodymium, nickel, permalloy or another ferromagnetic material.

The at least two magnetic elements may each have a width of less than 5 mm, a height of less than 20 mm and a depth of less than 100 mm. In particular, the at least two magnetic elements may each have a width of approximately 3 mm to 4.5 mm, a height of approximately 8 mm and a depth (or length) of approximately 30 mm.

The shaft of the pole piece may have a width of less than 5 mm, a height of less than 20 mm and a depth of less than 100 mm.

The cap may be semi-circular or semi-elliptical in cross-section and may have a major axis with a diameter of less than 15 mm. In other embodiments, the cap may have a rectangular, square, triangular, regular or irregular polygonal shape in cross-section.

It will be understood that other dimensions may be required to suit a particular size and shape of a test strip or interrogation zone.

In accordance with a second aspect of the invention, there is provided a device (e.g. a diagnostic reader) for conducting assays comprising a magnetic assembly; an assay test platform, which comprises an interrogation zone; and a rotatably mounted moveable arm; wherein the magnetic assembly is provided on the rotatably mounted moveable arm such that rotation of the rotatably mounted moveable arm moves the magnetic assembly between a stored position and an operating position.

Thus, embodiments of the second aspect of the invention provide a device for conducting assays that incorporates a magnetic assembly, which may be as described above, on a rotatable arm for quick and easy deployment when required. As rotation of the arm also changes the orientation of the magnetic assembly relative to the interrogation zone, and thereby the direction of high magnetic field strength generated by the magnetic assembly is also altered, it is not necessary to move the magnetic assembly a huge distance away from the interrogation zone in order to reduce the magnetic field strength in the interrogation zone to a negligible amount when not required. Thus, a smaller, portable (e.g. point of care) device can be constructed.

The magnetic assembly may be in accordance with the first aspect of the invention.

The operating position may be located a first distance from the interrogation zone; the stored position may be located a second distance from the interrogation zone; and the first distance may be less than the second distance.

In the operating position, the magnetic assembly may extend along the interrogation zone.

The device may further comprise a shield arranged to shield the magnetic assembly from the interrogation zone when the magnetic assembly is in the stored position.

The magnetic assembly may be configured to generate a high magnetic field in the interrogation zone when in the operating position and to generate a low magnetic field in the interrogation zone when in the stored position.

The magnetic assembly may be provided on the rotatably mounted moveable arm such that the cap is located adjacent the interrogation zone when the magnetic assembly is in the operating position; and, when in the stored position, the cap is directed away from the interrogation zone, though dependent on shield geometry, the orientation of the cap need not be critical to ensuring the resultant field experienced by the test strip is sufficiently low.

The rotatably mounted moveable arm may be configured for rotation in a vertical plane. In other embodiments, the rotatably mounted moveable arm may be configured for rotation in a horizontal or oblique plane.

In accordance with a third aspect of the invention there is provided a method of operating the device of the second aspect of the invention, comprising:

storing the magnetic assembly in the stored position;
providing a sample on the assay test platform;
rotating the rotatably mounted moveable arm to manoeuvre the magnetic assembly from the stored position, to the operating position;
pinning magnetic particles in the sample to a test bed in the interrogation zone due to attraction of the magnetic particles to the magnetic assembly;
evacuating the sample; and
analysing the interrogation zone to detect a presence or absence of an analyte.

Thus, embodiments of the third aspect of the invention provide a method for conducting assays in which the magnetic assembly is only rotated to a position close to the interrogation zone after a sample has been provided on the assay test platform, thus ensuring that the sample is not exposed to a magnetic field generated by the magnetic assembly until after the sample is in place. Furthermore, the rotational movement of the magnetic assembly ensures the high magnetic field strength in the region of the cap can be quickly and easily directed towards or away from the interrogation zone (i.e. when not required). This change in orientation of the magnetic assembly brought about by rotation of the rotatably mounted moveable arm also permits the distance by which the magnetic assembly must be moved away from the interrogation zone to be less than otherwise required (i.e. when using vertical or horizontal translational movement) so as to provide a negligible magnetic field strength in the interrogation zone when in the stored position.

In accordance with a fourth aspect of the invention there is provided a method of operating the device of the second aspect of the invention, comprising:

storing the magnetic assembly in the stored position;
rotating the rotatably mounted moveable arm to manoeuvre the magnetic assembly from the stored position, to the operating position;
pinning magnetic particles in the device to a test bed in the interrogation zone due to attraction of the magnetic particles to the magnetic assembly;
providing a sample on the assay test platform;
evacuating the sample; and
analysing the interrogation zone to detect a presence or absence of an analyte.

Thus, in some cases the magnetic particles may be pinned to the test bed in a test strip before the sample is introduced so as to maintain the magnetic particles in an even or pre-defined distribution for ease of subsequent detection of the analyte.

In some embodiments, the magnetic assembly may comprise permanent magnetic elements configured to provide a strong magnetic field strength of typically over 500 mT as measured at the test strip location, with a homogenous and consistent coverage, which is effective over a full width of the interrogation zone of a test strip.

Notably, the magnetic assembly is arranged such that the magnetic field strength is directional, such that on one side of the magnetic assembly, a region of high magnetic field strength is established (around the cap), while on the opposing side, the magnetic field strength is low (i.e. negligible). By such provision, the magnetic assembly can be rotated such that in an operating position, the magnetic assembly is oriented with the region of high magnetic field strength directed towards the interrogation zone of the test strip; and in a stored position, the region of low magnetic field strength is directed towards the interrogation zone of the test strip. This means that the distance that the magnetic assembly must be moved away from the sample to avoid interference during an interaction period when the sample and reagent are first combined (referred to as the incubation phase) can be minimised, reducing the physical size of the apparatus. The low magnetic field strength exhibited in the stored position also means that the amount of shielding required, and the attractive force between the magnetic assembly and the shield is reduced. Consequently, the force required to move the magnetic assembly away from the shield is also reduced, thus permitting use of a smaller and less powerful motor, further reducing a physical size of the apparatus. These features make the use of such a magnetic assembly more appropriate for a portable device for conducting assays, and in particular, a POCT device.

In some embodiments, the proposed magnetic assembly comprises two magnetic elements; each one being attached to either side of a central component. The central component is formed of a ferromagnetic pole piece and the magnetic elements are configured such that a north pole (or south pole) of each magnetic element faces inwardly, in opposing directions, towards the central component.

The central component comprises a shaft and an arcuate, curved, or domed cap located on one end of the shaft. The cap extends (i.e. protrudes) over a lateral surface of each magnetic element in a direction orthogonal to the direction of the shaft. The cap thus has a diameter that is larger than a width of the shaft such that the cap overhangs the shaft, and at least a portion of each magnetic element. There may or may not be a gap provided between the overhanging portion of the cap and each magnetic element.

The curved surface of the cap may deflect the magnetic field lines by up to 90 degrees; and the size and shape of the cap may affect the spread and return path of the magnetic field lines. This deflection of the magnetic field lines has the effect of reducing the magnetic flux density in the region directly above a pole of the cap, which in turn increases the magnetic field strength in the regions laterally adjacent to the pole. This spreading of the magnetic field strength has a further effect of reducing the relative impact of any discontinuities in the magnetic field due to the heterogeneous nature of the magnetic elements.

Aspects of the invention relate to a magnetic assembly for use in a device for conducting assays.

The magnetic assembly may be used in a point-of-care testing (POCT) device.

The magnetic assembly may comprise a plurality, for example, two magnetic elements. The magnetic assembly may further comprise a ferromagnetic material or pole piece, which may be interposed between the two magnetic elements such that a sandwich construction is created. Alternatively, the magnetic assembly may comprise a single magnet that is constructed to wrap around the pole piece to provide at least two magnetic elements (i.e. sections) on either side of the pole piece. For example, the single magnet may be annular in shape and may be disposed around a central core of a ferromagnetic material.

The magnetic assembly is advantageously configured to generate a high magnetic field strength on one side of the assembly, and a low or negligible magnetic field strength on an opposing side of the assembly.

The cap may extend partially, or completely, over the lateral surfaces of each of the at least two magnetic elements.

The cap may extend over a total length of the magnetic elements, or may extend along a partial length of the magnetic elements. A cross-section through the shaft and domed cap of the pole piece may be generally mushroom shaped.

In an embodiment where the magnetic assembly comprises a single annular magnet disposed around a central pole piece core, the cap may be circular and may extend partially or fully in a radial direction across the annular magnet.

The shaft may have a depth/length generally equal to the depth/length of the magnetic elements. Alternatively, the shaft may have a depth/length greater than, or less than the depth/length of the magnetic elements.

The shaft may have a height generally equal to the height of the magnetic elements. Alternatively, the height of the shaft may be greater than, or less than the height of the magnetic elements.

The cap may protrude from a first end of the shaft. The second end of the shaft, which opposes the first end, and is distal to the cap, may be flush with the faces of the magnetic elements, or may be offset therefrom.

The magnetic elements may have a width of less than 5 mm, or less than 4 mm, or less than 3 mm, or less than 2 mm.

The magnetic elements may have a height of less than 20 mm, or less than 10 mm, or less than 5 mm, or less than 2 mm.

The magnetic elements may have a depth of less than 200 mm, or less than 100 mm, or less than 50 mm, or less than 20 mm, or less than 10 mm, or less than 5 mm, or less than 2 mm.

The shaft may have a width of less than 5 mm, or less than 4 mm, or less than 3 mm, or less than 2 mm, or less than 1 mm. In some embodiments, the shaft has a width of 1.4 mm.

The shaft may have a height of less than 20 mm, or less than 10 mm, or less than 5 mm, or less than 2 mm, or less than 1 mm.

The shaft may have a depth of less than 200 mm, or less than 100 mm, or less than 50 mm, or less than 20 mm, or less than 10 mm, or less than 5 mm, or less than 2 mm, or less than 1 mm.

In an embodiment where the cap is semi-circular in cross-section, a diameter of the semi-circle may be less than 15 mm, or may be less than 10 mm, or may be less than 5 mm, or may be less than 2 mm.

In an embodiment where the cap is semi-elliptical in cross-section, a diameter of a major axis of the semi-ellipse may be less than 15 mm, or may be less than 10 mm, or may be less than 5 mm, or may be less than 2 mm. A diameter of a minor axis of the semi-ellipse may be less than 10 mm, or may be less than 5 mm, or may be less than 2 mm.

A width of the shaft may be sufficiently wide; and the magnetic field strength of the magnetic elements may be sufficiently matched to a magnetic capacity of the shaft so that an attractive force between the magnetic elements and the pole piece is greater than a repellent force between the magnetic elements.

Thus, the magnetic assembly may be self-assembled and may be held together by magnetic forces. In the case where this is not true, or for added security, the magnetic assembly may be held together by some additional means in order to overcome the repellent force, for example glue.

Grain sizes in typical magnetic elements may vary between 1 and 500 micrometres in diameter. In some embodiments, the grain size in each magnetic element is less than 2 micrometres in diameter or less than 1 micrometre in diameter.

Variation in a direction of a magnetic pole between typical magnetic elements can be up to 15 degrees. In some embodiments, the variation in direction of the magnetic pole between the magnetic elements is less than 2 degrees.

The magnetic elements may be manufactured, formed, or composed of ferromagnetic materials that produce their own persistent magnetic field, and may include, for example, ferrite, iron, cobalt, magnetite, neodymium, nickel, or permalloy.

The pole piece may be manufactured, formed, or composed of any suitable material such as ferromagnetic or ferrimagnetic materials, and may include iron, nickel or cobalt. Alternatively, the pole piece may be formed of an alloy containing ferromagnetic components. In some embodiments, the pole piece may be magnetic and may be formed of magnetisable material.

An optional metal cap may be disposed on a south pole end of at least one of the magnetic elements.

The magnetic assembly may form part of a device for conducting assays. The device for conducting assays may be in the form of a small interactive device that comprises an interactive display screen, through which a user may operate the device. The screen may be a touch-screen, or may comprise buttons, or may comprise a combination of both. The device may also comprise a test strip port, through which, an assay cassette or test strip may be inserted into the device. A hatch or door may cover the test strip port to protect the internal components when not in use. The hatch may be opened to reveal the test strip port, into which the test strip is inserted. Once the test strip has been inserted, the hatch may be closed and the test/assay may be commenced. Following the test, the hatch may be opened, and the test strip removed.

The internal components of the device may be contained in a housing and may comprise the magnetic assembly described above; a moveable arm, which may be pivotally mounted to a pivot point on the housing; a magnetic shield; an assay test platform, on which the test strip is located during testing; a heater, which may apply heat to the test strip; a strip connector to provide an electrical interface between the test strip and device meter (e.g. for fluid detection and movement control, impedance measurement or electrochemical assay measurement); at least one, for example, 1, 2, 3, 4, 6, 8, 10 or 12 piezo benders, which on receiving an electrical signal, may deflect and apply a force on the test strip (alternatively, the piezo benders may be configured to release an applied force on receipt of an electrical signal); and an optics block, which may perform optical analysis on the test strip. The optics block may comprise a camera and a light source. The test strip port located on the exterior of the device permits access to the assay test platform located in the interior of the device. The assay test platform comprises an interrogation zone, which is where assay analysis is performed.

The magnetic assembly is mounted on the moveable arm. The moveable arm may be rotatably mounted to the device for conducting assays at the pivot point and, by such provision, the magnetic assembly may be moved relative to the device.

The magnetic assembly may be generally shaped to match the shape of the interrogation zone so as to provide a high magnetic field strength evenly over substantially all of the interrogation zone. For example, in the operating position, the cap may be aligned with the interrogation zone and may extend across an entire extent of the interrogation zone (which may cover one or more test channels).

The moveable arm may manoeuvre the magnetic assembly between an operating position, and a stored position. In the operating position, the cap of the magnetic assembly may face a first direction, and in the stored position, the cap of the magnetic assembly may face a second, generally opposing, direction. The first direction may be generally towards the interrogation zone; and the second direction may be generally away from the interrogation zone.

A magnetic shield may be disposed within the device, on or near the moveable arm such that the magnetic shield may shield the interrogation zone from the magnetic assembly when the magnetic assembly is in the stored position. The magnetic shield may be stationary; alternatively, the magnetic shield may be moveable relative to the assay test platform. The moveable arm may manoeuvre the magnetic assembly relative to the magnetic shield.

In the operating position the magnetic assembly may be interposed between the magnetic shield and the assay test platform such that the magnetic assembly is adjacent the interrogation zone. In the stored position, the magnetic assembly may be located remotely from the interrogation zone, such that the magnetic shield is interposed between the interrogation zone and the magnetic assembly.

In the operating position, the magnetic assembly may be orientated such that a high magnetic field strength is directed towards, and in close proximity to, the interrogation zone. In the stored position, the magnetic assembly may be orientated such the high magnetic field strength is directed away from, and located remotely from, the interrogation zone. In this configuration, a low magnetic field strength (i.e. from a base of the magnetic assembly) is directed towards the interrogation zone.

The movable arm may be rotatable in one or more of a yaw, a pitch and a roll direction. In particular, the moveable arm may be rotatable through a vertical plane, a horizontal plane, or an oblique plane.

In use, an assay may be conducted by inserting the test strip (including a sample and reagents including magnetic beads) into the assay test platform, via the test strip port. During this stage, the magnetic assembly may be located in the stored position and the shield may be located between the assay test platform and the magnetic assembly, such that the test strip is shielded from the magnetic field of the magnetic assembly. The magnetic assembly may also be orientated such that the high magnetic field strength in the region of the cap is directed away from the test strip. This allows the sample and reagents in the test strip to interact in a region of low or negligible magnetic field during an incubation stage.

The magnetic assembly may then be manoeuvred into the operating position such that the magnetic assembly is adjacent the interrogation zone. The magnetic assembly may be orientated such that the region of high magnetic field strength is now directed towards the test strip. This causes magnetic beads in the reagent to be attracted towards the magnetic assembly, and effectively pinned to a base of the test strip (with the analyte and detection particles attached thereto if the analyte is present in the sample). This is referred to as the capture stage.

The test strip may then be flushed, cleaned or evacuated to remove any unbound particles from the test strip. This is referred to as the evacuation stage.

Finally, measurements may be by means of optical interrogation of fluorescent particles using an optical measurement system (i.e. the optics block) or any other suitable measurement devices or techniques. This is referred to as the measurement stage. In some instances, this stage could be performed before the evacuation stage.

Once the measurement stage is complete, the magnetic assembly may then be manoeuvred from the operating position to the stored position, and the test strip may be removed from the assay test platform.

In another embodiment, the test strip may be inserted; the magnetic assembly may be moved to the operating position adjacent the test strip to provide a high magnetic field strength to hold down the magnetic particles in the interrogation zone as provided in a test strip during manufacturing (i.e. to maintain a uniform layer or pre-defined test bed of particles); the sample is then applied and moved to the interrogation zone whereby capture and sandwich reactions occur on the uniform layer of magnetic particles; the interrogation zone is evacuated to remove the sample and unbound particles; the optical or other measurement is performed on the interrogation zone; and the magnetic assembly is moved to the stored position and the test strip removed from the device.

In a further embodiment, the movable arm may be moved such that the magnetic assembly is rotated to modify the magnetic field strength in the interrogation zone for different stages of the assay analysis.

Further aspects of the invention are detailed in the following numbered clauses:

1. A diagnostic reader, comprising:
   a magnetic assembly comprising a first magnet, a second magnet, and a pole piece, wherein:
   (i) each magnet has a length, a length axis aligned with the length of the magnet, and a magnetic field axis oriented substantially perpendicular to the length axis;
   (ii) the first and second magnets define a gap therebetween with the north pole of the magnetic field of each magnet oriented toward the other magnet; and
   (iii) the pole piece comprises a gap portion disposed within at least a portion of the gap and a cap portion disposed outside of the gap and covering at least a portion of a lateral surface each magnet.
2. The diagnostic reader of clause 1, wherein the length axis of each magnet is within 15 degrees, within 10 degrees, within 5 degrees, or within 2.5 degrees of being parallel to the length axis of the other magnet.
3. The diagnostic reader of clause 1 or 2 wherein the first and second magnetics are substantially parallel to one another along the length axis thereof.
4. The diagnostic reader any of the foregoing clauses, wherein each of the first and second magnets defines a width and a height along dimensions that are within 5 degrees, within 2 degrees, within 1 degree, within 0.5 degrees, or within 0.25 degrees of being perpendicular to one another and to the length axis of the magnet.

5. The diagnostic reader of clause 4, wherein the length of each magnet is greater than the width or the height of the magnet.
6. The diagnostic reader of clause 5, wherein the length of each magnet is at least about 2×, at least about 3×, or at least about 5× greater than the width of the magnet.
7. The diagnostic reader of clause 5 or 6, wherein the length of each magnet is less than about 10×, less than about 7.5×, or less than about 5× greater than the width of the magnet.
8. The diagnostic reader of any of clause 4-7, wherein the height of each magnet is aligned to within 5 degrees, within 2 degrees, within 1 degree, within 0.5 degrees, or within 0.25 degrees to an axis perpendicular to the magnetic field axis of the magnet and the height of the magnet is greater than the width of the magnet.
9. The diagnostic reader of clause 8, wherein the height of each magnet is at least about 1.5×, at least about 2×, or at least about 3× greater than the width of the magnet.
10. The diagnostic reader of clause 8 or 9, wherein the height of each magnet is about 5× or less, about 4× or less, or about 3.5× or less greater than the width of the magnet.
11. The diagnostic reader of any preceding clause wherein at least one or both of the first and second magnets comprises at least two separate magnets.
12. The diagnostic reader of any preceding clause, wherein the pole piece comprises one or more separate components.
13. The diagnostic reader of any preceding clause, wherein at least one or both of the magnets is a single, integral magnet.
14. The diagnostic reader of any preceding clause, wherein at least one or both of the magnets is a cuboid.
15. The diagnostic reader of clause 14, wherein at least one or both of the magnets is a rectangular cuboid.
16. The diagnostic reader of any preceding clause, wherein the gap portion of the pole piece occupies at least 70%, at least 80%, at least 90%, at least 95%, at least 97.5%, or essentially all of the volume of the gap between the first and second magnets.
17. The diagnostic reader of any preceding clause, wherein the gap portion of the pole piece extends along at least 70%, at least 80%, at least 90%, at least 95%, at least 97.5%, or essentially all of the length of the gap between the first and second magnets along an axis substantially aligned with the length axis of each magnet.
18. The diagnostic reader of any preceding clause, wherein the gap extends along at least 50%, at least 75%, at least 85%, at least 95%, at least 97.5% or essentially all of the length of the first and second magnets.
19. The diagnostic reader of any preceding clause, wherein the gap extends along at least 50%, at least 75%, at least 85%, at least 95%, at least 97.5% or essentially all of the height of the first and second magnets.
20. The diagnostic reader of any preceding clause, wherein the first and second magnets are entirely separated by the gap, i.e., are not in direct contact.
21. The diagnostic reader of any preceding clause, wherein the gap portion of the pole piece is a cuboid.
22. The diagnostic reader of clause 21, wherein the gap portion of the pole piece is a rectangular cuboid.
23. The diagnostic reader of any preceding clause, wherein the cap portion of the pole piece extends along at least 50%, at least 70%, at least 80%, at least 90%, at least 95%, at least 97.5%, or essentially all of the length of each of the first and second magnets.
24. The diagnostic reader of any preceding clause, wherein a thickness of the cap portion of the pole piece along an axis perpendicular to the magnetic field axes of the first and second magnets is greatest at a midpoint of the gap.
25. The diagnostic reader of any preceding clause, wherein an outer surface of the cap portion of the pole piece facing away from the first and second magnets is convex.
26. The diagnostic reader of clause 25, wherein a radius of curvature of the outer surface of the cap portion of the pole piece is at least about 0.75 mm, at least about 1 mm, at least about at least about 1.5 mm, or at least about 1.75 mm.
27. The diagnostic reader of clause 25 or 26, wherein a radius of curvature of the outer surface of the cap portion of the pole piece is about 5 mm or less, about 3.5 mm or less, about 2.5 mm or less, or about 2 mm or less.
28. The diagnostic reader of any of clause 25-27, wherein the center point of the radius of curvature of the convex outer surface of the cap portion of the pole piece is disposed within the gap between the first and second magnets.
29. The diagnostic reader of clause 28, wherein the center point of the radius of curvature of the convex outer surface of the cap portion of the pole piece is disposed in the gap between the first and second magnets.
30. The diagnostic reader of any of clauses 25-29, wherein, with respect to the center point of the radius of curvature of the convex outer surface of the cap portion of the pole piece, the cap portion of the pole piece subtends an angle of at least about 90°, at least about 100°, at least about 110°, or at least about 120°.
31. The diagnostic reader of any of clauses 25-30, wherein, with respect to the center point of the radius of curvature of the convex outer surface of the cap portion of the pole piece, the cap portion of the pole piece subtends an angle of about 150° or less, of about 140° or less, of about 130° or less, or of about 125° or less.
32. The diagnostic reader of any of clauses 25-31, wherein the cap portion of the pole piece is a truncated cylinder.
33. The diagnostic reader of any of clauses 25-32, wherein the outer surface of the cap portion is ellipsoidal.
34. The diagnostic reader of any preceding clause, wherein the cap portion of the pole piece is dome shaped.
35. The diagnostic reader of any preceding clause, wherein the at least two magnets each have a width of less than 10 mm, a height of less than 20 mm and a length of less than 100 mm.
36. The diagnostic reader of any preceding clause, wherein the at least two magnets each have a width of at least 4 mm, a height of at least 8 mm, and a length of at least 25 mm.
37. The diagnostic reader of any preceding clause, wherein the gap portion has a maximum width of less than 10 mm, of less than 8 mm, of less than 6 mm, of less than 4 mm, or less than of less than 2 mm.
38. The diagnostic reader of any preceding clause, wherein the gap portion has a minimum width of at least 2 mm, of at least 4 mm, of at least 6 mm, of at least 8 mm, or of at least 10 mm.

39. The diagnostic reader of any preceding clause, wherein the gap portion has a uniform width along its length.
40. The diagnostic reader of any preceding clause, wherein (i) the magnetic assembly defines a maximum width between an outer surface of the first magnet and an outer surface of the second magnet taken along an axis generally parallel to the magnetic field axis of each magnet, (ii) the cap portion of the pole piece defines a maximum width taken along an axis generally parallel to the magnetic field axis of each magnet, and (iii) the maximum width of the cap portion of the pole piece is about 95% or less of the maximum width of the magnetic assembly, about 85% or less of the maximum width of the magnetic assembly, about 75% or less of the maximum width of the magnetic assembly, or about 65% or less of the maximum width of the magnetic assembly or the diagnostic reader of any of the preceding clauses wherein (i) the cap portion of the pole piece covers at least about 1%, at least about 5%, at least about 10%, at least about 25%, or at least about 50% of the lateral surface of each of the first and second magnets or (ii) the cap portion of the pole piece covers about 60% or less, about 50% or less, about 30% or less, or about 10% or less of the lateral surface of each of the first and second magnets.
41. The diagnostic reader of any preceding clause, wherein (i) the magnetic assembly defines a maximum width between an outer surface of the first magnet and an outer surface of the second magnet taken along an axis generally parallel to the magnetic field axis of each magnet, (ii) the cap portion of the pole piece defines a maximum width taken along an axis generally parallel to the magnetic field axis of each magnet, and (iii) the maximum width of the cap portion of the pole piece is at least about 65% of the maximum width of the magnetic assembly, at least about 70% of the maximum width of the magnetic assembly, at least about 75% of the maximum width of the magnetic assembly, at least about 85% of the maximum width of the magnetic assembly or at least about 90% of the maximum width of the magnetic assembly.
42. The diagnostic reader any preceding clause, wherein the pole piece and/or the first and second magnets comprise one or more of: ferrite, iron, cobalt, magnetite, neodymium, nickel, permalloy or another ferromagnetic material.
43. The diagnostic reader of any preceding clause, wherein the first and second magnets have a magnetic field strength sufficient for causing an attractive force between the first and second magnets and the pole piece to be greater than a repellent force between the first and second magnets, such that the magnetic assembly is capable of being held together by magnetic forces.
44. The diagnostic reader any preceding clause, wherein the length axis and magnetic field axis of each magnet are within 15 degrees, within 10 degrees, within 7.5 degree, within 5 degrees, within 2.5 degrees, or within 1.5 degrees of being perpendicular to one another.
45. The diagnostic reader of any preceding clause, wherein (i) the reader is configured to accommodate a diagnostic cartridge having at least one detection zone therein and (ii) the reader is configured to move the magnetic assembly from an active position in which a magnetic field generated by the magnetic assembly is capable of immobilizing magnetic particles within the detection zone and an inactive position in which the magnet field generated by the magnetic assembly does not immobilize magnetic particles within the detection zone.
46. The diagnostic reader of clause 45, wherein the diagnostic cartridge is substantially planar and, in the active position, the magnetic field axis of each of the first and second magnets is within 7.5 degrees, within 5 degrees, within 2.5 degrees, or within 1 degree of being parallel to a plane defined by the diagnostic cartridge.
47. The diagnostic reader of clause 46, wherein, in the inactive position, an angle between the magnetic field axis of each of the first and second magnets and the plane defined by the diagnostic cartridge is at least 50 degrees, at least 60 degrees, at least 75 degrees, at least 90 degrees, or at least 110 degrees.
48. The diagnostic reader of any of clauses 45-47, wherein the detection zone has a major axis substantially aligned with a direction of flow of liquid within the detection zone and, in the active position, the major axis of the detection zone and the length axis of each of the first and second magnets are within 7.5 degrees, within 5 degrees, within 2.5 degree, within 1 degree, or within 0.5 degrees of being perpendicular to one another.
49. The diagnostic reader of any of clauses 45-48, wherein the reader is configured to rotate the magnetic assembly between the active and inactive positions about an axis generally parallel to the plane defined by the diagnostic cartridge.
50. The diagnostic reader of any of clauses 45-49, wherein the reader is configured to rotate the magnetic assembly between the active and inactive positions about an axis that does not intersect the first magnet, the second magnet, or the pole piece.
51. The diagnostic reader of any of clauses 45-50, wherein, in the active position, the cap portion of the pole piece is disposed between the first and second magnets and the diagnostic cartridge.
52. The diagnostic reader of any of clauses 45-51, wherein, in the active position, a lateral surface of each of the first and second magnets is disposed above the gap.
53. The diagnostic reader of any of clauses 45-51, wherein, in the active position, an axis defined by the height of each of the first and second magnets is substantially perpendicular to the plane of the diagnostic cartridge.

For the avoidance of doubt, any feature described in respect of any aspect of the invention may be applied to any other aspect of the invention, in any appropriate combination.

BRIEF DESCRIPTION OF DRAWINGS

Embodiments of the present invention will now be described in detail and with reference to the figures in which.

DETAILED DESCRIPTION OF THE DRAWINGS

Figure 1:
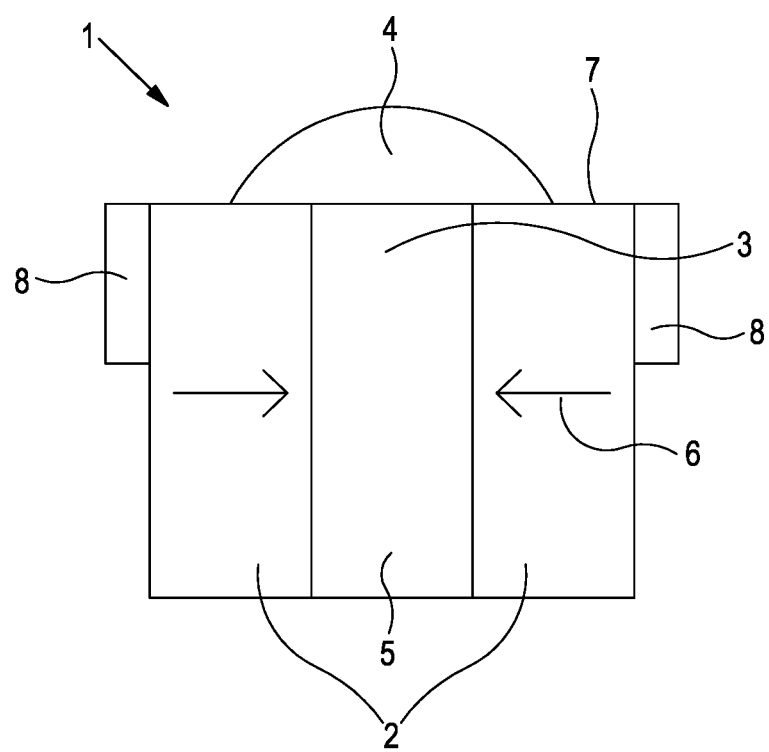
FIG. 1 is a cross-sectional view of a magnetic assembly according to a first embodiment of the present invention.
Figure 2:
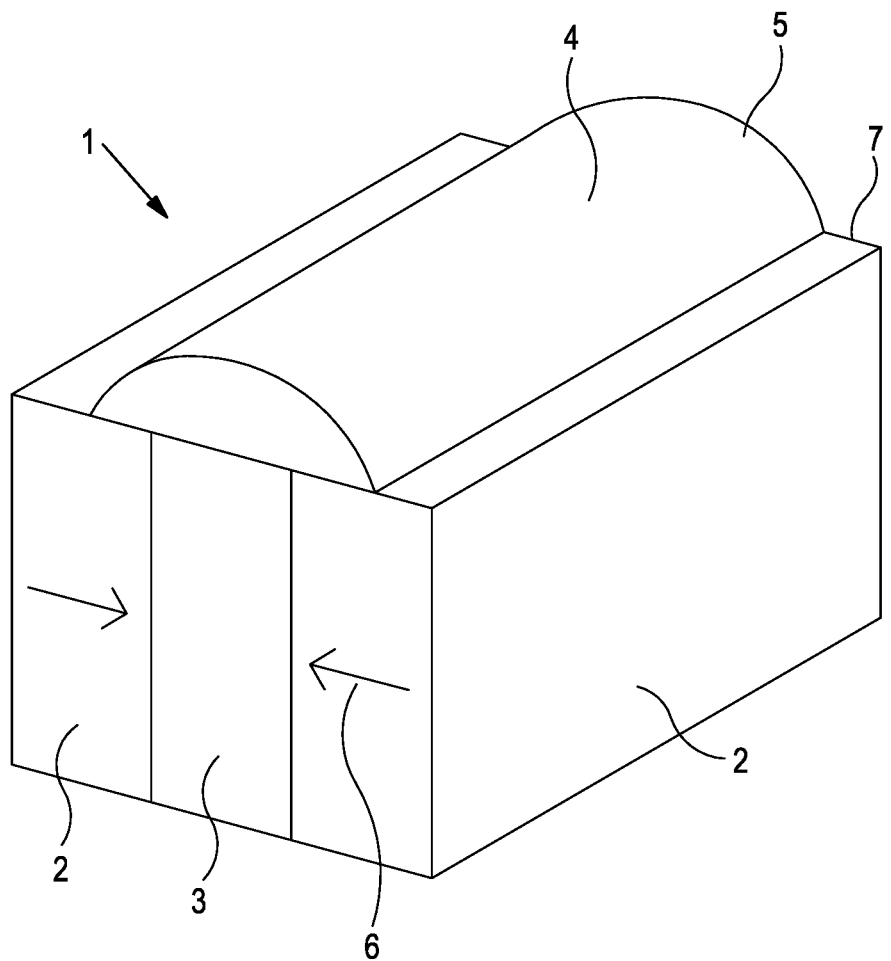
FIG. 2 is a perspective view of the magnetic assembly of FIG. 1, without optional metal plates.

FIGS. 1 and 2 show a magnetic assembly 1 according to a first embodiment of the present invention. The magnetic assembly 1 is suitable for use in a device for conducting assays, for example for point-of-care testing.

The magnetic assembly 1 comprises two magnetic elements 2. The polarity of the magnetic elements 2 is identified by arrows 6, wherein the arrows 6 point to a north pole of each magnetic element 2 as per standard convention.

Interposed between the magnetic elements 2, is a central pole piece 5 of ferromagnetic material. The pole piece 5 comprises a longitudinal shaft 3 and a cap 4, which is connected to a top of the shaft 3, as shown, such that the pole piece 5 is generally mushroom shaped. The cap 4 extends partially over a lateral surface 7 of the magnetic elements 2. The cap 4 extends the full length (i.e. depth) of the magnetic elements 2 (shown in FIG. 2).

The magnetic elements 2 are formed of ferromagnetic materials. In the present embodiment, the magnetic elements 2 are formed of ferrite. In other embodiments, the magnetic elements may be formed of, for example, iron, cobalt, magnetite, neodymium, nickel, or permalloy.

The pole piece 5 may be formed of ferromagnetic or ferrimagnetic materials. In the present embodiment, the pole piece 5 is formed of iron. In other embodiments, the pole piece 5 may be formed of nickel, cobalt, or ferromagnetic alloys containing iron, nickel or cobalt.

FIG. 1 also shows the inclusion of two optional metal plates 8, attached to top portions of the side surfaces of each magnetic element 2 so as to constrain the return path of the magnetic field from the pole piece 5 to the corresponding opposite pole faces of the magnetic elements 2. Thus, the metal plates 8 help to minimise the magnetic field at the base of the magnetic assembly 1, as shown.

Figure 3:
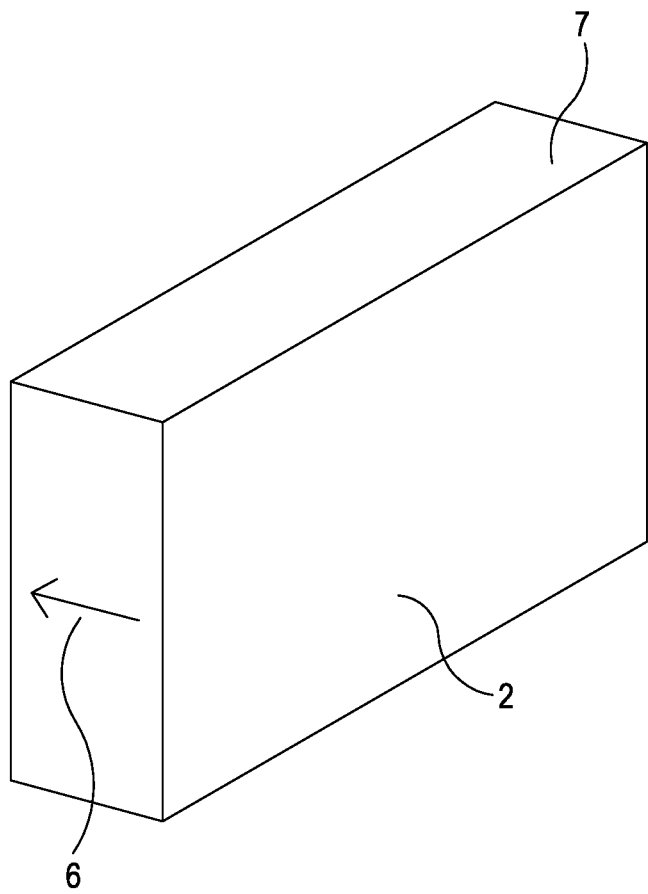
FIG. 3 is a perspective view of a single magnetic element employed in the magnetic assembly of FIG. 1.

FIG. 3 shows an individual magnetic element 2. The arrow 6 indicates the direction of the north pole of the magnetic element 2. The pole piece 5 and second magnetic element 2 have been removed from FIG. 3 for clarity. Thus, it can be seen that each individual magnetic element 2 is cuboidal.

Figure 4:
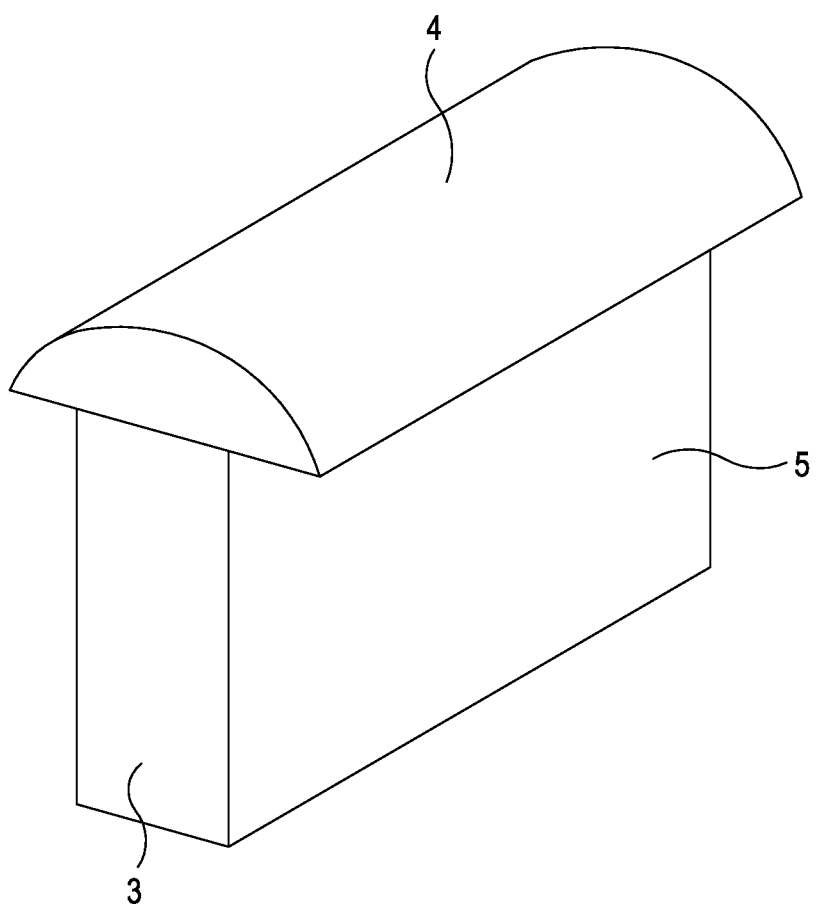
FIG. 4 is a perspective view of a pole piece employed in the magnetic assembly of FIG. 1.

FIG. 4 shows the pole piece 5, which has a cuboidal longitudinal shaft 3, and a domed or arcuate cap 4 extending along an entire length of the shaft 3. The magnetic elements 2 have been removed from FIG. 4 for clarity.

Figure 5A:
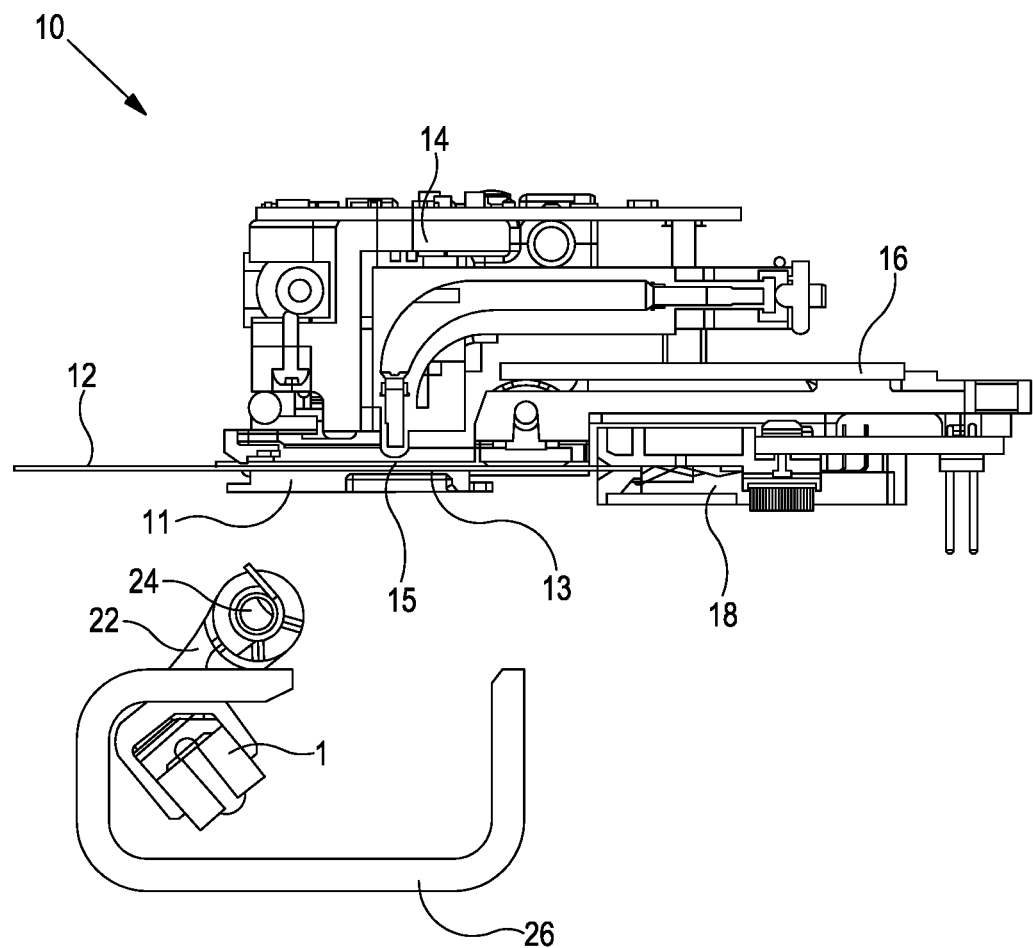
FIG. 5a shows a schematic of the interior components of a device for conducting assays, comprising the magnetic assembly of FIG. 1 in a stored position.
Figure 5B:
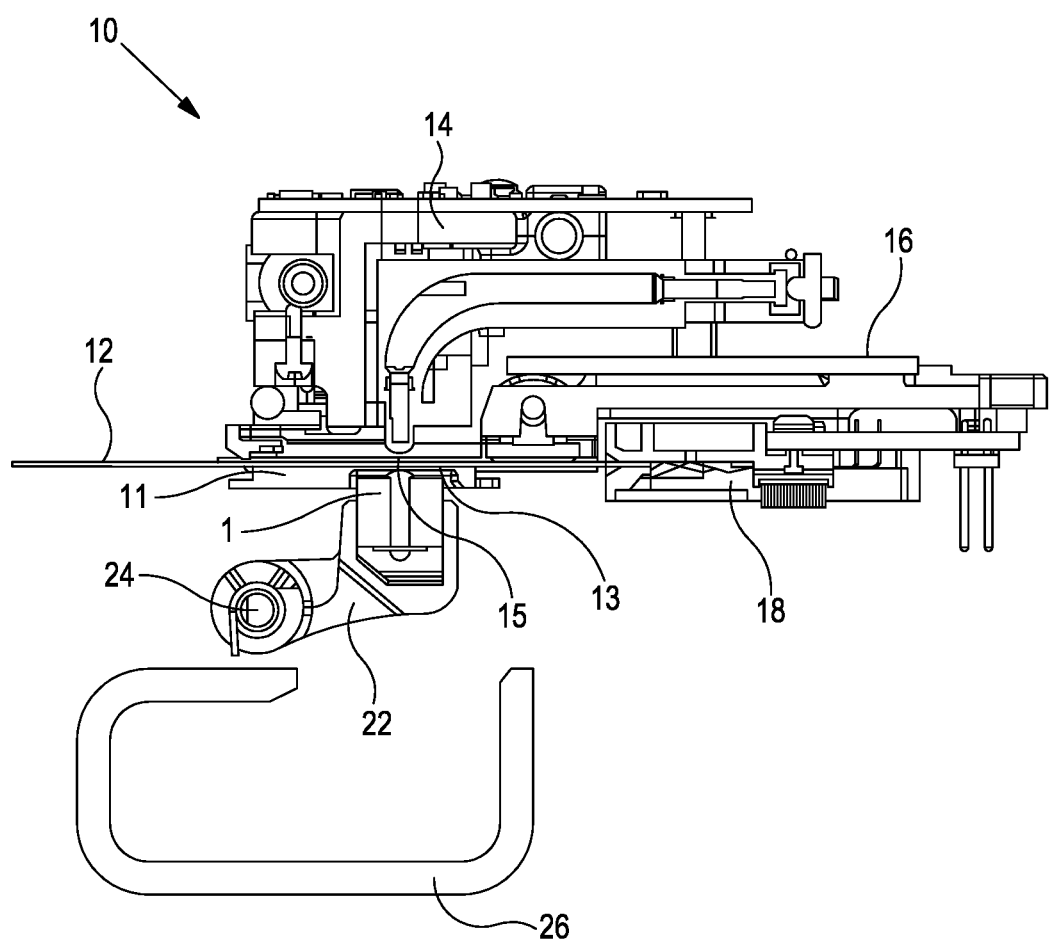
FIG. 5b shows a schematic similar to FIG. 5a but with the magnetic assembly of FIG. 1 rotated into an operating position.

FIGS. 5a and 5b show internal components 10 of a device (e.g. diagnostic reader) for conducting an assay in accordance with an embodiment of the invention, in both a stored position (FIG. 5a) and an operating position (FIG. 5b). The internal components 10 comprise a moveable arm 22, which is pivotally mounted to a pivot point 24 on the housing (not shown); the magnetic assembly 1 is mounted to a distal end of the moveable arm 22 (in other embodiments, other magnetic assemblies may be provided); a magnetic shield 26 is provided in which the magnetic assembly is located when in a stored position; an assay test platform 11, on which a test strip 12 is located during testing; a heater 13, which may apply heat to the test strip 12; a strip connector 18; a set of piezo benders 16, which on receiving an electrical signal, deflect and apply a force on the test strip 12 (alternatively, the piezo benders 16 may be configured to release an applied force on receipt of an electrical signal); and an optics block 14, which is configured to perform optical analysis on the test strip 12. The optics block 14 comprises a camera and a light source (not shown). A test strip port located on an exterior of the device permits access to the assay test platform 11 located in the interior of the device. The assay test platform 11 comprises an interrogation zone 15, where assay analysis is performed.

In the stored position (FIG. 5a), the movable arm 22 is positioned away from the assay test platform 11 so that the magnetic assembly 1 (i.e. cap) is oriented away from the interrogation zone 15 and is located within the shield 26. In the operating position (FIG. 5b), the movable arm 22 is rotated about its pivot point 24 so that the magnetic assembly 1 (i.e. cap) is moved adjacent the assay test platform 11 and is oriented towards the interrogation zone 15. In which position, the magnetic assembly 1 will exert a high magnetic field strength over the entire interrogation zone 15 to pin down magnetic particles present in the test strip 12 to a test bed.

The piezo benders 16 are configured to be operatively associated with gas filled chambers (not shown) present on the test strip 12. Upon receipt of an electrical signal, the piezo benders 16 deflect, causing the gas filled chambers to be compressed and consequently expel the contained gas, causing directional movement of a liquid sample within microfluidic channels of the test strip 12. On removal of the electrical signal, the piezo benders 16 return to their original shape, thus removing the compressive force on the gas filled chambers and creating a negative pressure in the chamber, thus drawing the liquid sample back towards the chamber, causing opposing directional movement of the liquid sample within the microfluidic channels of the test strip 12. This is described further in the Applicant's earlier patent application WO2018002668.

A heater 13 is provided along a full length of the assay test platform 11, which can be implemented as required to heat the test strip 12 when present in the device, increasing the temperature of the liquid sample and reducing its viscosity. By such provision, the fluidity of the liquid sample can be increased.

Following evacuation of the sample, a measurement of the sample is performed by the optics block 14. For example, the optics block 14 may be configured to detect and/or measure luminescence from detection particles in the interrogation zone 15, the detection particles being bound to an analyte and pinned down to the test bed by magnetic particles under the influence of the magnetic assembly 1. As the magnetic assembly 1 is configured to exert a high magnetic field strength over the entire interrogation zone, individual magnetic particles will be pinned down in situ and will not be dragged into a line of high magnetic field strength as per the prior art. Accordingly, the optics block 14 may be able to detect and quantify individual magnetic particles indicative of the analyte in question.

Figure 5C:
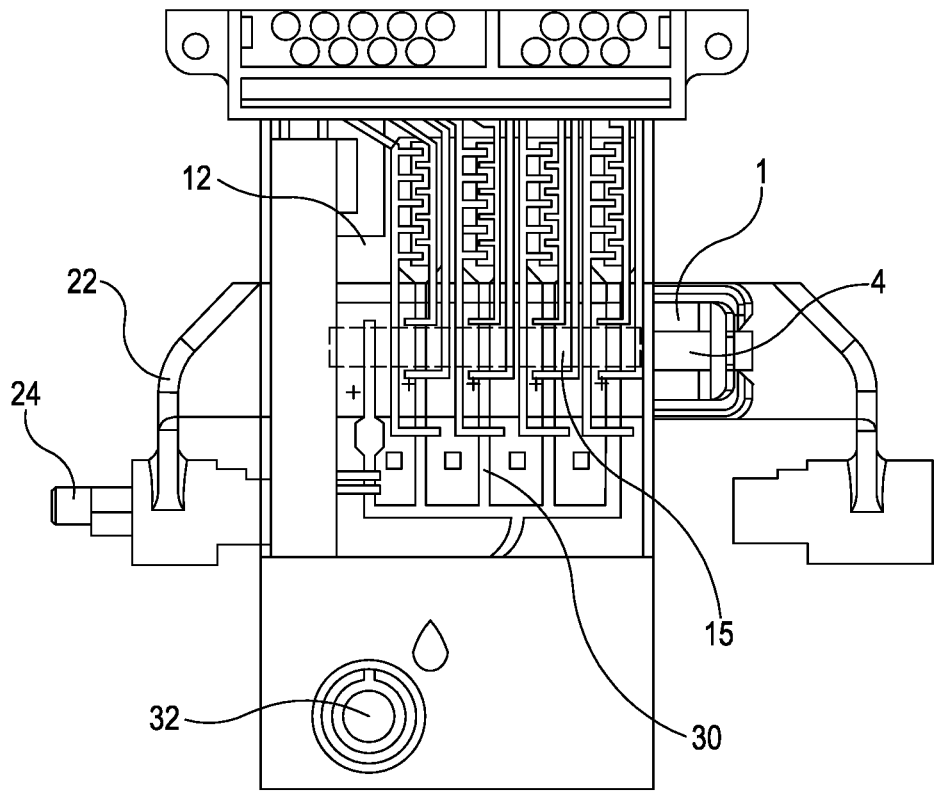
FIG. 5c shows a plan view of a test strip with the magnetic assembly of FIG. 1 in the operating position as per FIG. 5b.

FIG. 5c shows the relative orientation of the test strip 12 with the magnetic assembly 1 in the operating position as per FIG. 5b. Thus, it can be seen that the magnetic assembly 1 extends in a direction orthogonal to a direction of insertion of the test strip 12 into the device. In this case, the test strip comprises a sample inlet 32 and four test channels 30. Each of the channels 30 has a portion in the interrogation zone 15, which is located directly above the cap 4 to ensure a homogeneous distribution of magnetic particles through the interrogation zone 15.

Figure 6:
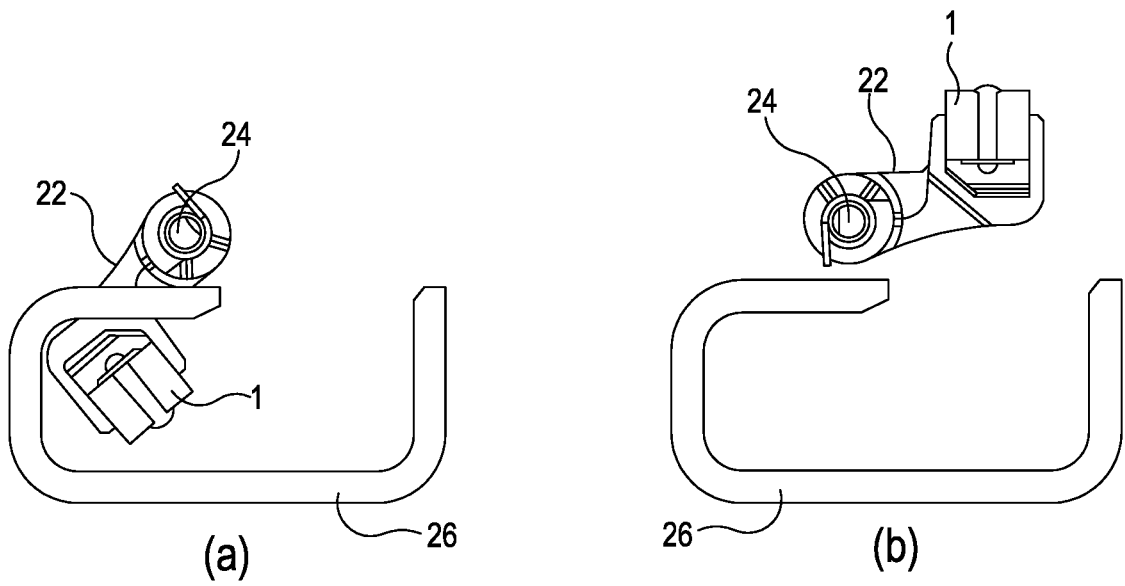
FIG. 6a shows a plan view of a shield and a moveable arm and magnetic assembly from the device shown in FIGS. 5a and 5b, in the stored position.
FIG. 6b shows a plan view similar to that of FIG. 6a, with the magnetic assembly in the operating position.

FIG. 6a shows the magnetic assembly 1 and movable arm 22 in the stored position and in an operating position in FIG. 6b. The movable arm 22 is pivotally attached to the device for conducting assays (not shown) at the pivot point 24, allowing the movable arm 22 to be manoeuvred between the two positions. In the stored position (FIG. 6a), the magnetic assembly 1 is oriented away from the interrogation zone (not shown) and is located behind the magnetic shield 26. In the operating position (FIG. 6b), the magnetic assembly 1 is oriented towards the interrogation zone, and is no longer located behind the magnetic shield 26, thus exposing the interrogation zone to the magnetic field of the magnetic assembly 1.

Figure 7:
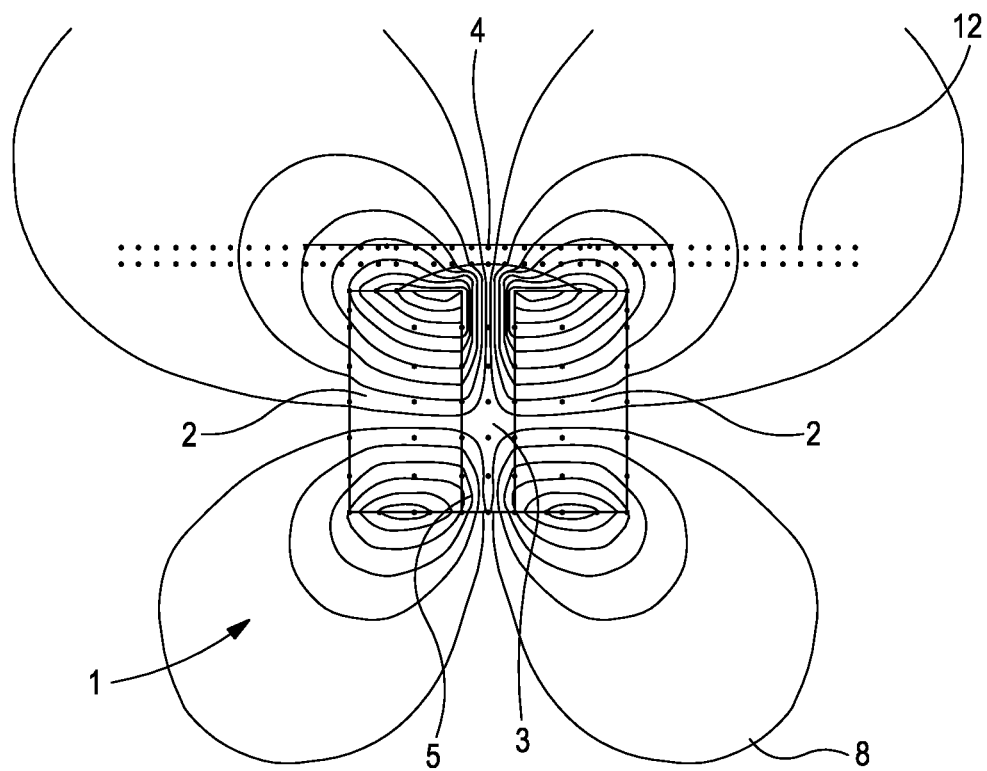
FIG. 7 shows a contour plot of the magnetic field lines and magnetic flux density surrounding the magnetic assembly when adjacent a test strip.

FIG. 7 is a contour plot showing magnetic field lines 8 surrounding the magnetic assembly 1 when in the operating position, where the magnetic assembly 1 is oriented towards and in close proximity to the test strip 12. The magnetic elements 2, shaft 3 of the pole piece 5 and cap 4 are also shown.

The contour plot is configured such that in the regions of highest magnetic flux density the magnetic field lines 8 are closer together, whereas in the regions of lowest magnetic flux density the magnetic field lines 8 are further apart.

It can be seen that the presence of the domed cap 4, causes a redistribution of the magnetic field lines 8 above the cap 4, when compared to the opposing end of the shaft 3. The magnetic field lines 8 are redistributed over a larger area, which has the effect of reducing the magnetic flux density. This has the effect of homogenising the magnetic field and the magnetic field strength over a larger area and across the full area of the test strip 12 in the interrogation zone.

Figure 8:
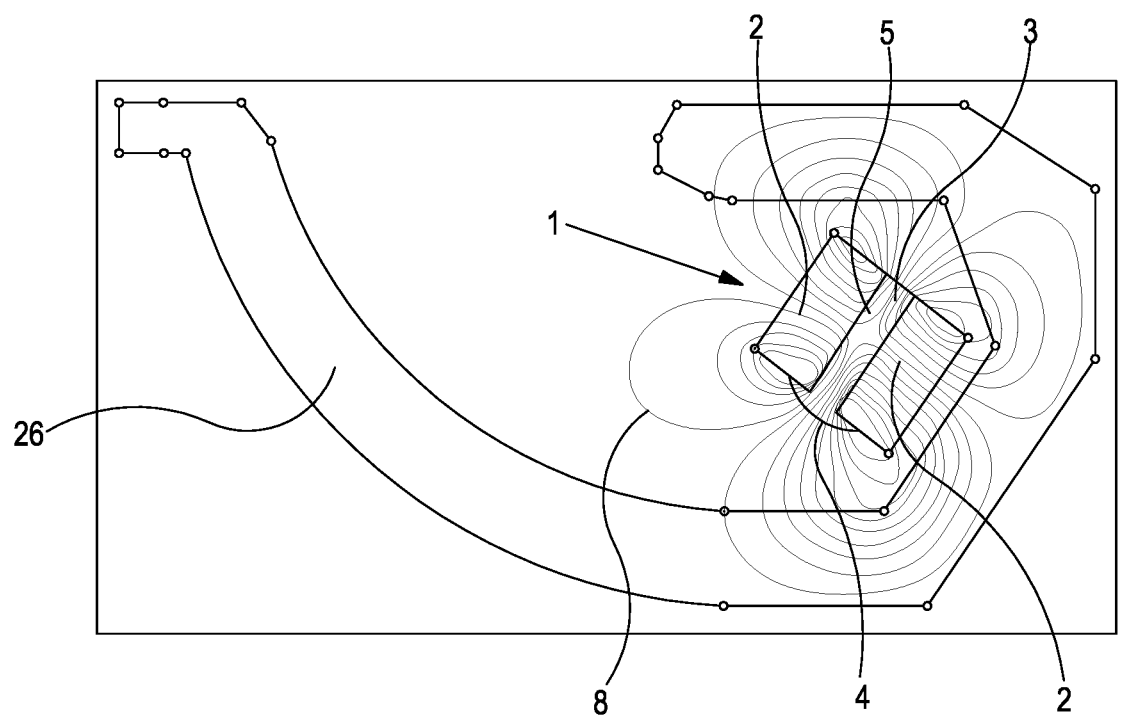
FIG. 8 shows a contour plot showing the magnetic field lines and magnetic flux density surrounding the magnetic assembly when stored in the shield.

FIG. 8 is a contour plot showing the magnetic field lines 8 surrounding the magnetic assembly 1, when in the stored position, where the magnetic assembly 1 is oriented away from the interrogation zone (not shown) and is located behind the magnetic shield 26. The magnetic elements 2, shaft 3 of the pole piece 5 and cap 4 are also shown.

The contour plot is configured such that in the regions of highest magnetic flux density the magnetic field lines 8 are closer together, whereas in the regions of lowest magnetic flux density the magnetic field lines 8 are further apart.

The effect of the magnetic shielding can clearly be seen. The greatest magnetic flux density is experienced in the region of the cap 4, and within the region of the shield 26 surrounding the magnetic assembly 1; whereas the exterior of the shield 26 experiences very low or negligible magnetic flux density.

Figure 9:
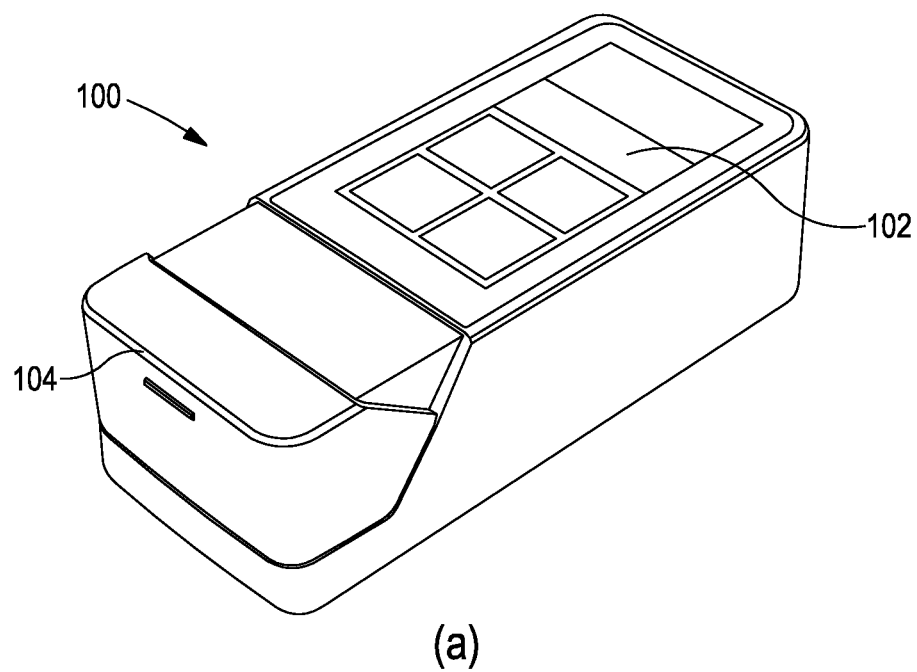
FIG. 9a is a perspective view of a device for conducting assays in accordance with an embodiment of the invention, in a closed configuration.
FIG. 9b is a perspective view of the device of FIG. 9a, in an open configuration showing a slot into which a test strip can be inserted.
Figure 9:
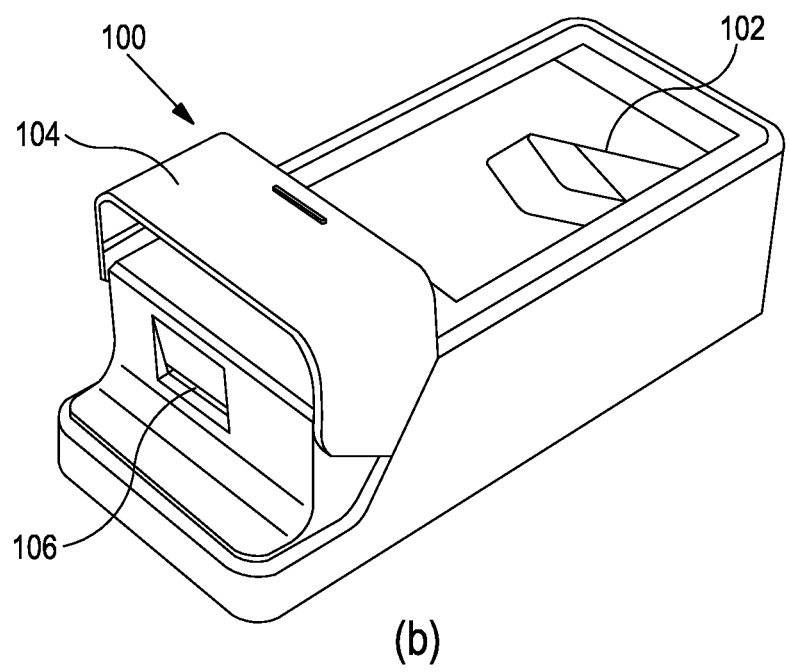

FIGS. 9a and 9b show an exterior of a device 100 for conducting assays in accordance with embodiments of the invention in both a closed configuration (FIG. 9a) and an open configuration (FIG. 9b). The device 100 includes the internal components 10 of FIGS. 5a and 5b and further comprises an interactive display screen 102 and a hatch 104 which, when opened, permits access to a test strip port 106, into which a test strip 12 can be inserted. The test strip port 106 provides access to the assay test platform (not shown) located in the interior of the device 100. In use, the device 100 is powered on and a user may control the device 100 using the interactive display screen 102 to select and/or configure a test to be performed. The hatch 104 is opened and a test strip 12 is inserted into the test strip port 106. The hatch 104 is then closed and the test may commence. The test may commence automatically, or following user input via the interactive display screen 102. Once the test is completed, the hatch 104 is opened and the test strip 12 is removed from the test strip port 106. A different test strip 12 may then be inserted and a further test be performed or, alternatively, the hatch 104 can be closed and the device 100 powered down using the interactive display screen 102.

Figure 10:
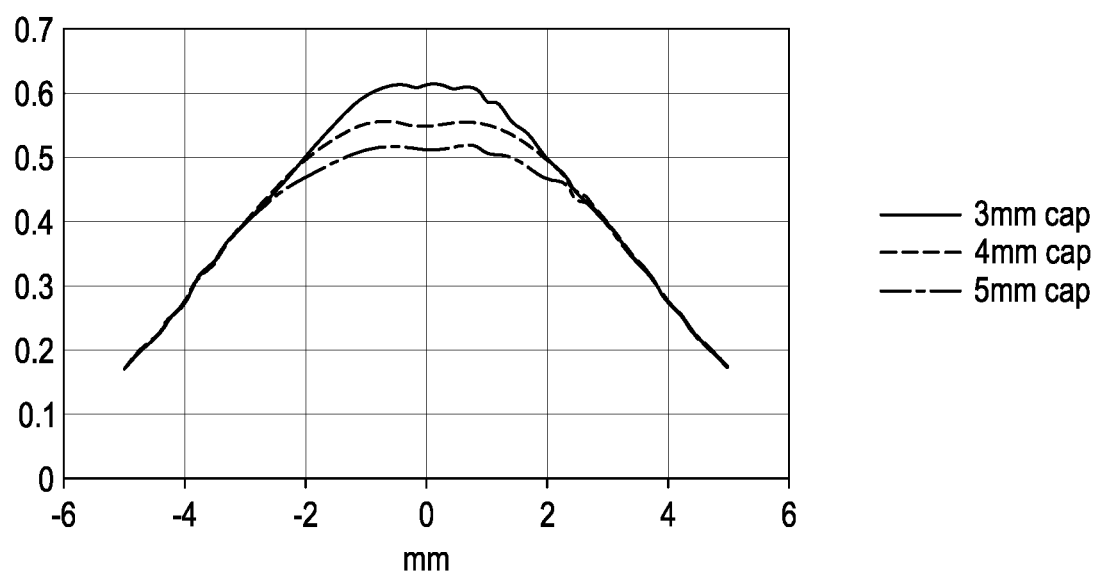
FIG. 10 shows a plot of magnetic field strength variation with increasing distance from a centre of the magnetic assembly, for varying cap diameters.

FIG. 10 shows variation in magnetic field strength with increasing distance from a centre of the pole piece 5, for a cap 4 width of 3 mm, 4 mm and 5 mm. It can clearly be seen that increasing the cap width has the effect of redistributing the magnetic field, thereby reducing the peak magnetic field strength at the centre of the pole piece 5.

Figure 11:
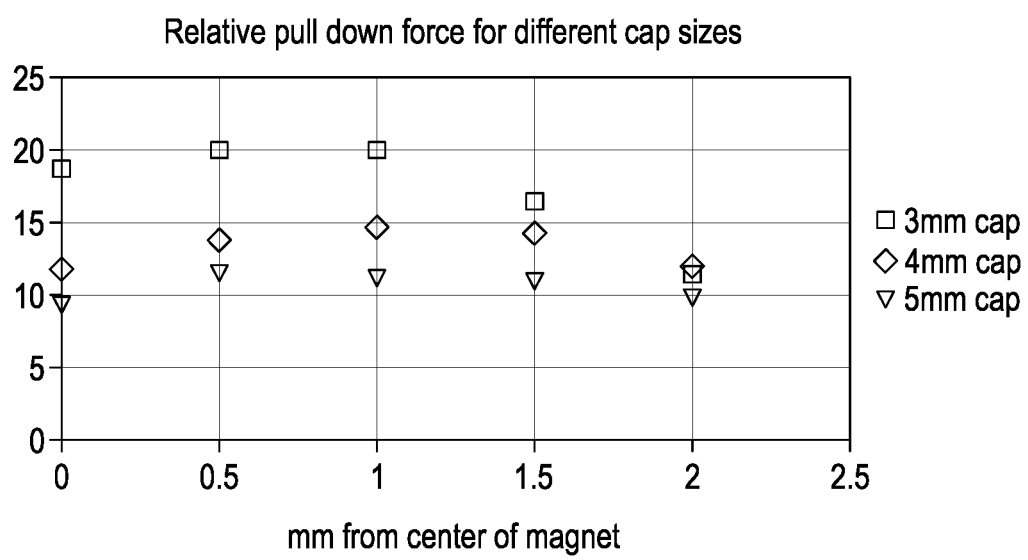
FIG. 11 shows a plot of the attractive force exerted on magnetic beads in a test strip with increasing distance from a centre of the magnetic assembly, for varying cap diameters.

FIG. 11 shows relative attractive forces acting on the magnetic particles to pin them down to the test bed using a cap 4 width of 3 mm, 4 mm and 5 mm, respectively. It can clearly be seen that for a cap width of 3 mm, the attractive force greatly reduces with distance from the centre of the magnetic assembly 1; with the force at 1 mm away from the centre being almost double that of the force experienced at 2 mm from the centre. However, as the cap width increases, the attractive force is more homogenous across a greater distance, and with a cap width of 5 mm, the variation in attractive force between 0 mm and 2 mm away from the centre of the magnetic assembly 1 is negligible. Thus, extending the width of the cap 4 helps to spread the magnetic field strength more evenly over the interrogation zone.

Table 1 below shows an angle of attraction caused by the magnetic force relative to the centre of the magnetic assembly 1 at varying distances from the centre, where an angle of 0 degrees is vertically down towards the centre of the magnetic assembly 1, a positive angle signifies a pull towards the centre and a negative angle signifies a pull away from the centre. It can be seen that for a cap width of 3 mm a direction of the attractive forces at different distances from the centre of the magnetic assembly 1 vary widely, whereas for a cap width of 5 mm, the angles of the attractive forces at different distances from the centre are much more consistent with significantly less variation.

TABLE 1

Angles of attraction at different distances from the centre of the cap

| Distance from centre of magnet | Angle of Magnetic Force | | |
|---|---|---|---|
| | 3 mm cap | 4 mm cap | 5 mm cap |
| 0 | 0 | 0 | 0 |
| 0.5 | −0.2 | −5.4 | −4.3 |
| 1 | 0.3 | −1.9 | −1.2 |
| 1.5 | 13.3 | 3.6 | 0.4 |
| 2 | 25.6 | 14.6 | −0.8 |

Figure 12:
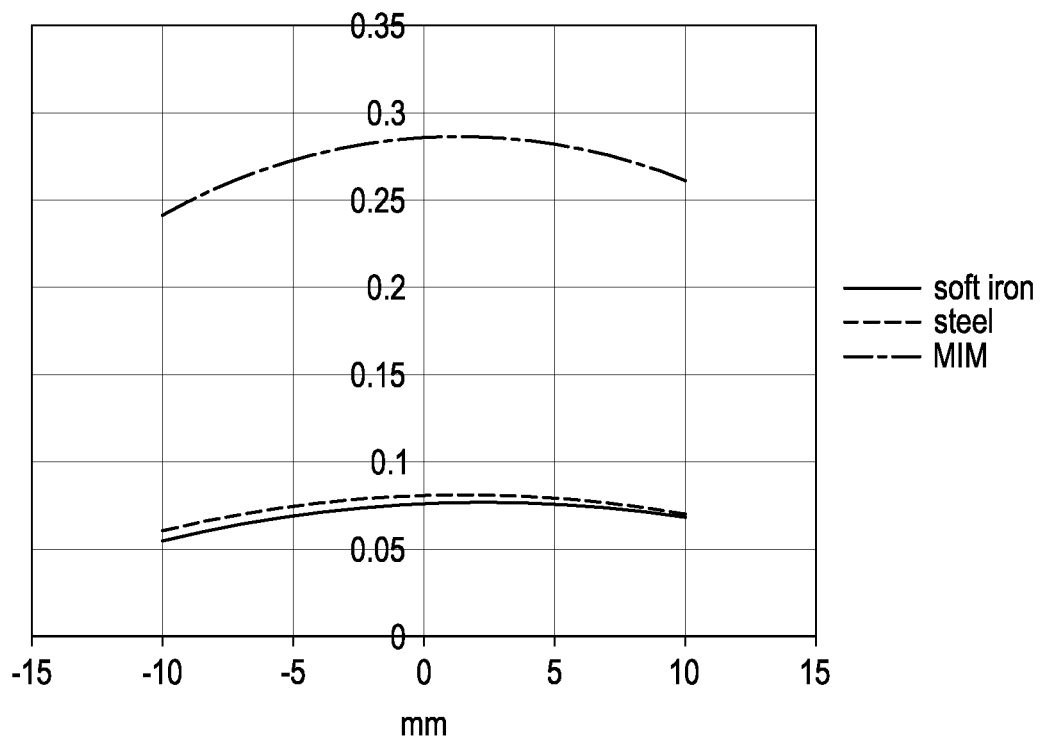
FIG. 12 shows a plot of the effective magnetic shielding for varying materials.

FIG. 12 shows the screening effects of different materials that may be used for the shield 26. It can be seen that the screening capability of a metal-insulator-metal (MIM) is significantly lower (allowing a greater magnetic field strength through the shield) than for soft iron or steel. In other words, FIG. 12 shows that comparatively the shielding characteristics of the soft iron are in line with those for steel, while the shielding characteristics of the MIM material are relatively poorer. However, various materials can be used to shield the magnetic field depending on a residual field that is allowable (i.e. that does not interfere with the assay when in the magnetic assembly is in the stored position).

Figure 13:
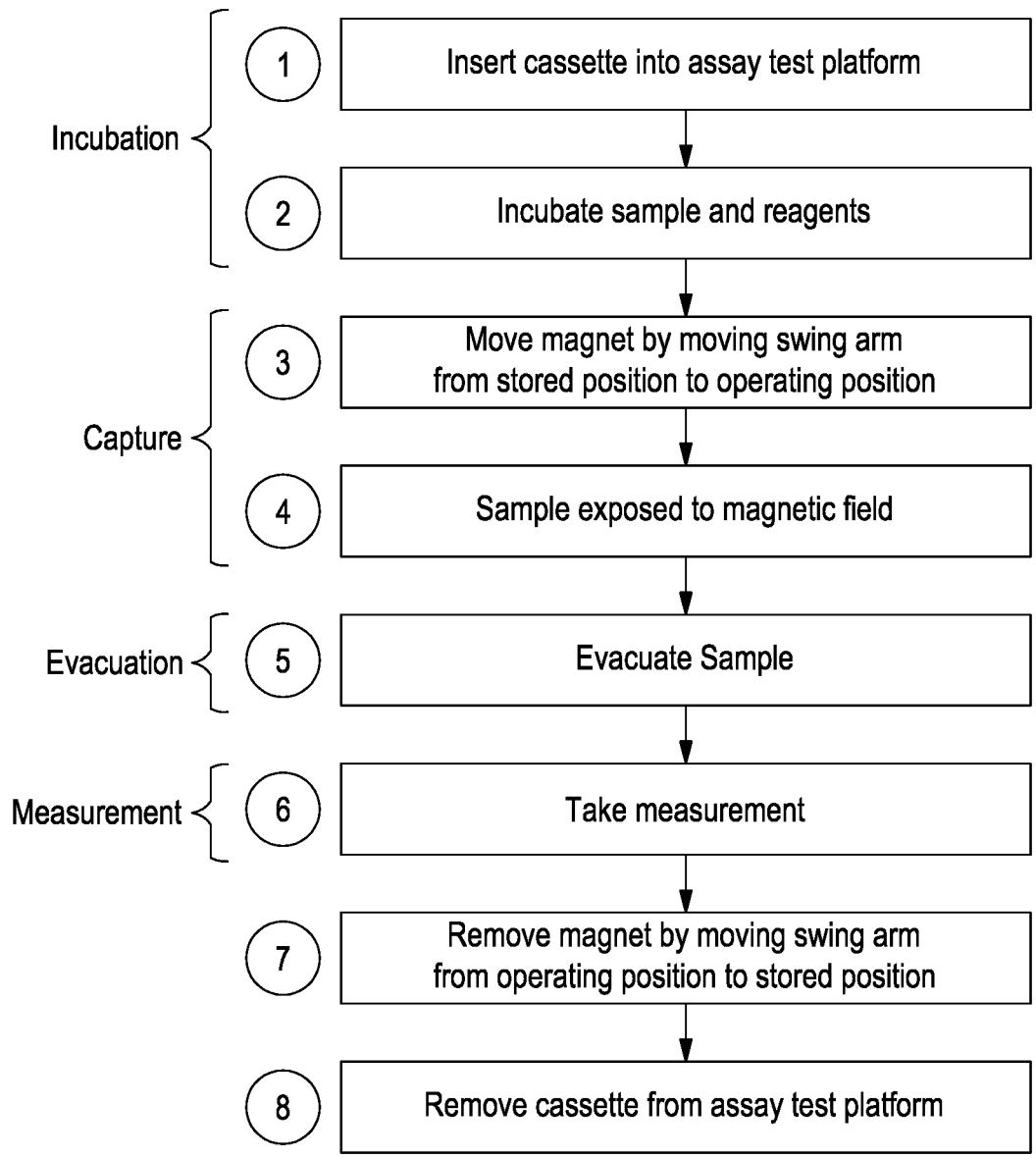
FIG. 13 shows steps of a method for conducting an assay according to an embodiment of the present invention.

FIG. 13 shows a method outlining steps that may be required when conducting an assay according to an embodiment of the present invention. Initially, a cassette, or test strip, is inserted into the assay test platform in step 1, via the test strip port 106 shown in FIG. 9*b*. Once inserted, the sample and reagents provided in the test strip 12 are mixed to allow the analyte to bind with the detection and capture particles in step 2. This is referred to as the incubation stage.

The magnetic assembly 1 is then manoeuvred into position by moving the movable (swing) arm 22 in step 3 so that the magnetic assembly 1 is moved from the stored position in which the magnetic assembly 1 is located behind the shield 26 and oriented away from the test strip 12; to the operating position where the magnetic assembly 1 is moved from behind the shield 26, and is reoriented towards the test strip 12.

In moving the magnetic assembly 1 towards the test strip 12, the test strip 12 is exposed to the magnetic field of the magnetic assembly 1 in step 4 such that the magnetic capture particles in the interrogation zone are pinned to the test bed. This is referred to as the capture phase.

The sample is then flushed, or evacuated to remove any unbound particles in order to enhance the sensitivity of the assay in step 5. This is referred to as the evacuation stage.

The measurement of the analyte is then performed using suitable measurement techniques to detect and/or quantify the analyte (i.e. by measuring luminescence of the detection particles bound with the analyte and magnetic capture particles) in step 6. In one embodiment, spectrophotometry is used as the measurement technique. In other embodiments, camera based techniques or electrochemical measurement techniques are employed. This is referred to as the measurement stage.

The swing arm 22 is then rotated to manoeuvre the magnetic assembly 1 away from the test strip 12 in step 7, from the operating position to the stored position, where the magnetic assembly 1 is located behind the shield 26, and oriented away from the test strip 12.

The cassette or test strip 12 is then removed from the assay test platform 11 of the device 100 in step 8.

Steps 1 to 8 of the above method can then be repeated with a further sample if required.

Thus, embodiments of the invention provide a magnetic assembly 1 for use in a device 100 for conducting assays such as those described in the above method, which allows more accurate measurements to be made due to the more even distribution of the magnetic field strength across the interrogation zone when the magnetic assembly 1 is in the operating position.

Whilst the foregoing description has described exemplary embodiments, it will be understood by those skilled in the art that many variations of the embodiments can be made within the scope of the present invention as defined by the claims. Moreover, features of one or more embodiments may be mixed and matched with features of one or more other embodiments.

Figure 14:
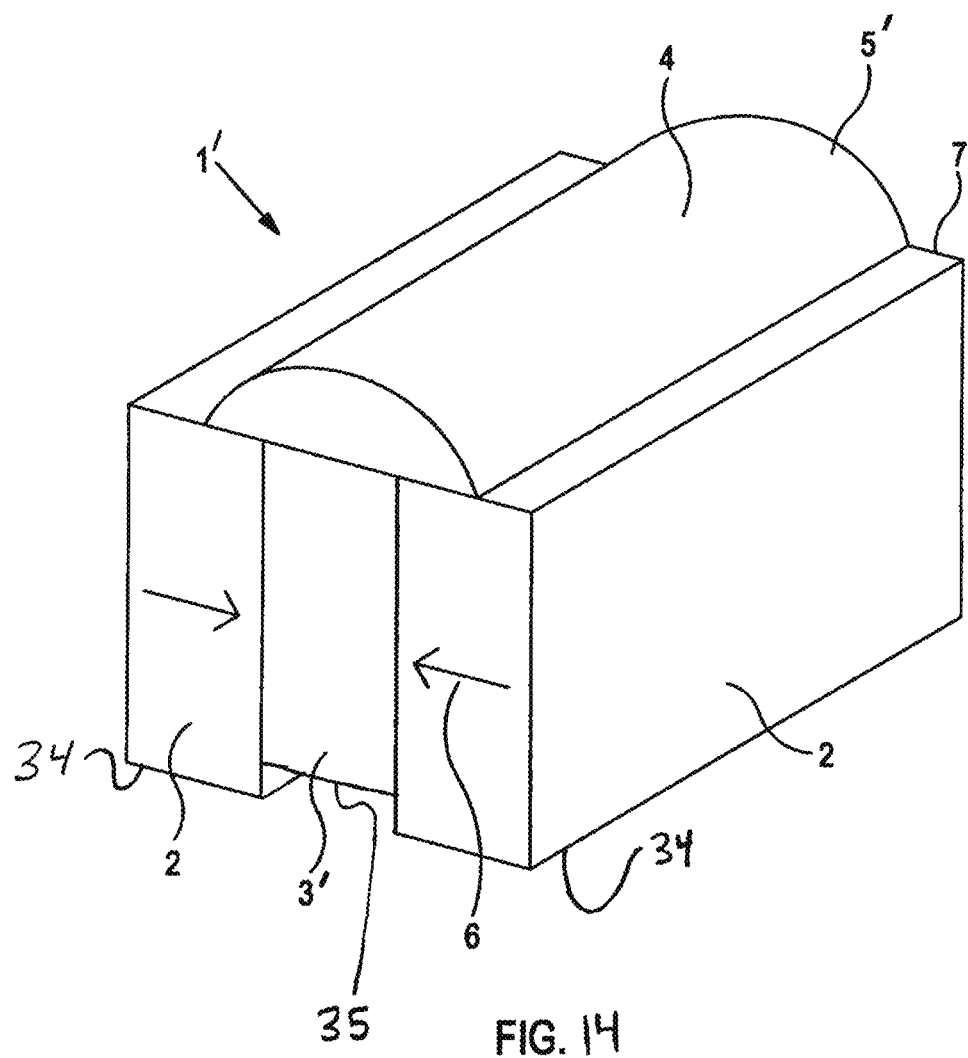
FIG. 14 is a perspective view of a magnetic assembly according to a second embodiment of the present invention, without optional metal plates and in which a height of a shaft of a pole piece of the magnetic assembly is less than a height of magnetic elements thereof.

FIG. 14 shows a magnetic assembly 1' according to a second embodiment of the present invention. Magnetic assembly 1' comprises magnetic elements 2 and a central pole piece 5' of ferromagnetic material disposed therebetween. In contrast to pole piece 5 of magnetic assembly 1, pole piece 5' comprises a longitudinal shaft 3' having an end 35 which is offset from an adjacent face 34 of each of the two magnetic elements 2.

The invention claimed is:

1. A magnetic assembly for use in a device for conducting assays, the magnetic assembly comprising a pole piece having a longitudinal shaft interposed between at least two magnetic elements, each of the at least two magnetic elements having a north magnetic pole and a south magnetic pole; the shaft having a length substantially equal to a length of the two magnetic elements; the at least two magnetic elements being orientated such that each north magnetic pole or each south magnetic pole is aligned inwardly towards the shaft; and wherein the pole piece comprises a cap at one end of the shaft which extends at least partially over an upper lateral surface of each of the at least two magnetic elements.

2. The magnetic assembly of claim 1, wherein the cap comprises a convexly curved surface that forms a dome.

3. The magnetic assembly of claim 1, wherein the pole piece has an end opposite the cap which is flush with an adjacent face of one or more of the at least two magnetic elements.

4. The magnetic assembly of claim 1, wherein the pole piece has an end opposite the cap which is offset from an adjacent face of one or more of the at least two magnetic elements.

5. The magnetic assembly of claim 1, wherein at least one metal plate is disposed on a side of one or more of the at least two magnetic elements, wherein the side faces outwardly of the pole piece.

6. The magnetic assembly of claim 1, wherein the at least two magnetic elements have a magnetic field strength sufficient for causing an attractive force between each of the at least two magnetic elements and the pole piece to be greater than a repellent force between the at least two magnetic elements, such that the magnetic assembly is held together by magnetic forces.

7. The magnetic assembly of claim 1, wherein the at least two magnetic elements are formed of a material having a grain size of less than 3 micrometres, or less than 2 micrometres, or less than 1 micrometres, or less than 0.5 micrometres.

8. The magnetic assembly of claim 1, wherein a variation in alignment of the north magnetic poles or south magnetic poles of the at least two magnetic elements is less than 5 degrees, or less than 2 degrees, or less than 1 degree, or less than 0.5 degrees.

9. The magnetic assembly of claim 1, wherein the pole piece and/or the at least two magnetic elements comprise one or more of: ferrite, iron, cobalt, magnetite, neodymium, nickel, or permalloy.

10. The magnetic assembly of claim 1, wherein the at least two magnetic elements each have a width of less than 5 mm, a height of less than 20 mm and a depth of less than 100 mm.

11. The magnetic assembly of claim 1, wherein the shaft of the pole piece has a width of less than 5 mm, a height of less than 20 mm and a depth of less than 100 mm.

12. The magnetic assembly of claim 1, wherein the cap is semi-circular or semi-elliptical in cross-section and has a major axis with a diameter of less than 15 mm.

13. A device for conducting assays comprising: a magnetic assembly of claim 1; an assay test platform, which comprises an interrogation zone; and a rotatably mounted moveable arm; wherein the magnetic assembly is provided on the rotatably mounted moveable arm such that rotation of the rotatably mounted moveable arm moves the magnetic assembly between a stored position and an operating position.

14. The device of claim 13 wherein the operating position is located a first distance from the interrogation zone; the stored position is located a second distance from the interrogation zone; and the first distance is less than the second distance; and/or wherein, in the operating position, the magnetic assembly extends along the interrogation zone.

15. The device of claim 13 further comprising a shield arranged to shield the magnetic assembly from the interrogation zone when the magnetic assembly is in the stored position.

16. The device of claim 13, wherein the magnetic assembly is configured to generate a high magnetic field in the interrogation zone when in the operating position and to generate a low magnetic field in the interrogation zone when in the stored position.

17. The device of claim 13, wherein the magnetic assembly is provided on the rotatably mounted moveable arm such that the cap is located adjacent the interrogation zone when the magnetic assembly is in the operating position; and, when in the stored position, the cap is directed away from the interrogation zone; and, optionally, wherein, in the operating position, the cap is aligned with the interrogation zone and extends across an entire extent of the interrogation zone.

18. The device of claim 13, wherein the rotatably mounted moveable arm is configured for rotation in a vertical plane.

* * * * *